US012801599B2

(12) United States Patent
El Bsat

(10) Patent No.: US 12,801,599 B2
(45) Date of Patent: Nov. 17, 2026

(54) LLM-GENERATED TEXT-TO-SQL VERIFICATION VIA DIRECTIONAL GRAPHS

(71) Applicant: Snowflake Inc., Bozeman, MT (US)

(72) Inventor: Yahia Khaled El Bsat, San Francisco, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/042,963

(22) Filed: Jan. 31, 2025

(65) Prior Publication Data

US 2026/0133964 A1 May 14, 2026

Related U.S. Application Data

(60) Provisional application No. 63/719,579, filed on Nov. 12, 2024.

(51) Int. Cl.

| | |
|---|---|
| ***G06F 16/2452*** | (2019.01) |
| ***G06F 16/242*** | (2019.01) |
| ***G06F 16/2455*** | (2019.01) |
| ***G06F 16/25*** | (2019.01) |
| ***G06F 16/901*** | (2019.01) |

(52) U.S. Cl.

CPC ...... *G06F 16/24522* (2019.01); *G06F 16/243* (2019.01); *G06F 16/2456* (2019.01); *G06F 16/258* (2019.01); *G06F 16/9024* (2019.01)

(58) Field of Classification Search

CPC ............. G06F 16/24522; G06F 16/243; G06F 16/2456; G06F 16/258; G06F 16/9024

See application file for complete search history.

(56) References Cited

U.S. PATENT DOCUMENTS

| | | | | |
|---|---|---|---|---|
| 6,282,537 | B1 * | 8/2001 | Madnick | G06F 16/2471 707/763 |
| 8,099,429 | B2 | 1/2012 | Deyo et al. | |
| 12,169,802 | B1 | 12/2024 | Eldan et al. | |
| 12,204,565 | B1 | 1/2025 | Yu et al. | |

(Continued)

OTHER PUBLICATIONS

"U.S. Appl. No. 18/668,624, Examiner Interview Summary mailed Apr. 16, 2025", 2 pgs.

(Continued)

*Primary Examiner* — Cam Y T Truong

(74) *Attorney, Agent, or Firm* — Schwegman Lundberg & Woessner, P.A.

(57) ABSTRACT

Described is a system for updating an LLM-generated SQL query preventing double counting by receiving a natural language query from a user at a cloud-based server, where the query requests access to data in a database. The data platform identifies semantic data from the query and, using a large language model (LLM), generates a SQL query containing join functions. The SQL query is then parsed to identify operation types and data sources. An undirected graph is constructed from the parsed query, with nodes representing data sources and edges representing join functions. The undirected graph is converted to a directed graph by adding relationship characteristics to the edges. Based on this directed graph, the data platform validates the SQL query to detect and resolve potential double counting issues and updates the SQL query as necessary to ensure accurate results.

17 Claims, 10 Drawing Sheets

(56) References Cited

U.S. PATENT DOCUMENTS

| | | | |
|---|---|---|---|
| 2008/0263078 | A1 | 10/2008 | Perry et al. |
| 2010/0023486 | A1 | 1/2010 | Rys et al. |
| 2017/0213157 | A1 | 7/2017 | Bugay et al. |
| 2021/0224346 | A1 | 7/2021 | Peng et al. |
| 2022/0129450 | A1 | 4/2022 | Cao et al. |
| 2023/0098783 | A1 | 3/2023 | Zaremoodi et al. |
| 2023/0099901 | A1 | 3/2023 | Li et al. |
| 2023/0245654 | A1 | 8/2023 | Shrivastava et al. |
| 2023/0297577 | A1 | 9/2023 | Vo et al. |
| 2024/0346021 | A1 | 10/2024 | Xuan et al. |
| 2024/0378389 | A1 | 11/2024 | Rose et al. |
| 2024/0406166 | A1 | 12/2024 | Bell et al. |
| 2024/0411528 | A1 | 12/2024 | Ziolkowski et al. |
| 2025/0005057 | A1 | 1/2025 | Khosla et al. |
| 2025/0086186 | A1* | 3/2025 | Srinivasan ............ G06F 16/256 |
| 2025/0110976 | A1 | 4/2025 | Channapattan et al. |
| 2025/0208844 | A1 | 6/2025 | Yu et al. |
| 2025/0245446 | A1 | 7/2025 | Ayed et al. |

OTHER PUBLICATIONS

"U.S. Appl. No. 18/668,624, Response filed Apr. 28, 2025 to Non Final Office Action mailed Feb. 3, 2025", 12 pgs.
"U.S. Appl. No. 18/668,624, Final Office Action mailed May 14, 2025", 18 pgs.
"U.S. Appl. No. 18/668,624, Examiner Interview Summary mailed Jun. 23, 2025", 2 pgs.
"U.S. Appl. No. 18/668,624, Response filed Jul. 9, 2025 to Final Office Action mailed May 14, 2025", 12 pgs.
"U.S. Appl. No. 18/668,624, Advisory Action mailed Jul. 25, 2025", 3 pgs.
Atscale, "A Semantic Layer for Optimized Cloud Costs and Performance", [Online]. Retrieved from the Internet: https: www.atscale.com , (Accessed online Aug. 7, 2025), 7 pages.
DBT Labs, "dbt Semantic Layer", [Online]. Retrieved from the Internet: https: docs.getdbt.com docs use-dbt-semantic-layer dbt-sl, (Accessed online Aug. 7, 2025), 4 pages.
Deptalla, Sebastian, "Tableau Relationships Basics the Ground Rules", [Online]. Retrieved from the Internet: https: interworks.com blog Aug. 4, 2022 tableau-relationships-basics-the-ground-rules , (Aug. 4, 2022), 12 pages.
Google Cloud Community, "The problem of SQL fanouts", [Online]. Retrieved from the Internet: https: discuss.google.dev t the-problem-of-sql-fanouts 119220, (Jun. 2022), 11 pages.
Google Cloud Looker, "symmetric aggregates", [Online]. Retrieved from the Internet: https: cloud.google.com looker docs reference param-explore-symmetric-aggregates, (Accessed online Aug. 7, 2025), 6 pages.
Google Cloud Looker, "Understanding symmetric aggregates", [Online]. Retrieved from the Internet: https: cloud.google.com looker docs best-practices understanding-symmetric-aggregates, (Accessed online Aug. 7, 2025), 6 pages.
Lyons, Bethany, "Relationships Data modeling in Tableau", (May 11, 2020), 13 pages.
Snowflake, "Cortex Analyst Paving the Way to Self Service Analytics with AI", [Online]. Retrieved from the Internet: https: www.snowflake.com en blog cortex-analyst-ai-self-service-analytics , (Aug. 15, 2024), 18 pages.
Snowflake Documentation, "Cortex Analyst semantic model specification", [Online]. Retrieved from the Internet: https: docs.snowflake.com user-guide snowflake-cortex cortex-analyst semantic-model-spec#create-a-semantic-model-using-the-model-generator?index=..%2F..index, (Accessed online Aug. 7, 2025), 23 pages.
Summer, Jason, "Translate Existing Semantic Layers for Use by Cortex Analyst", [Online]. Retrieved from the Internet: https: medium.com snowflake translate-existing-semantic-layers-for-use-by-cortex-analyst-2056edbd4753, (Sep. 13, 2024), 16 pages.
Tableau, "About Multi-fact Relationship Data Models", [Online]. Retrieved from the Internet: https: help.tableau.com current pro desktop en-us datasource_mfr_multiple_base_tables.htm, (Accessed online Aug. 7, 2025), 43 pages.
Tableau, "The Tableau Data Model", [Online]. Retrieved from the Internet: https: help.tableau.com current pro desktop en-us datasource_datamodel.htm, (Accessed online Aug. 7, 2025), 11 pages.
"U.S. Appl. No. 18/668,624, Non Final Office Action mailed Aug. 29, 2025", 18 pgs.
"Assistants API overview—OpenAI API", [Online]. Retrieved from the Internet: <https://www.pype.dev/thoughts-477/>, (Dec. 2024), 2 pgs.
"Customize Copilot and Create Agents", [Online]. Retrieved from the Internet: <https://www.microsoft.com/en-us/microsoft-365-copilot/microsoft-copilot-studio>, (2025), 10 pgs.
"Introducing GPTs | OpenAI", [Online]. Retrieved from the Internet: <https://openai.com/index/introducing-gpts/>, (Nov. 2023), 8 pgs.
"Overview of Copilot for Power BI—Power BI", [Online]. Retrieved from the Internet: <https://learn.microsoft.com/en-us/power-bi/create-reports/copilot-introduction>, (Aug. 2025), 8 pgs.
"Streamlit", [Online]. Retrieved from the Internet: <https://pypi.org/project/streamlit/>, (Aug. 2025), 7 pgs.
"Welcome to the Data Intelligence Platform: Databricks + Einblick", [Online]. Retrieved from the Internet: <https://www.databricks.com/blog/welcome-data-intelligence-platform-databricks-einblick>, (Jan. 2024), 7 pgs.
"What's new for Looker and business intelligence at Next '23", [Online]. Retrieved from the Internet: <https://cloud.google.com/blog/products/business-intelligence/whats-new-for-looker-and-business-intelligence-at-next-23>, (Aug. 2023), 9 pgs.
"Your AI Analyst delivering business-ready insights", [Online]. Retrieved from the Internet: <http://chrisandkarah.com/ai-analyst.html>, (2024), 3 pgs.
"U.S. Appl. No. 18/668,624, Non Final Office Action mailed Feb. 3, 2025", 18 pgs.
"U.S. Appl. No. 19/038,873, Non Final Office Action mailed Dec 22, 2025", 63 pgs.
Panda, Sanjeeb, et al., "Build Robust text to SQL Solution Generating Complex Queries Self Correcting and Querying Diverse Data Sources", (Mar. 5, 2024), 12 pages.
Ren, Tonghui, "Purple Making a Large Language Model a Better SQL Writer", (Mar. 29, 2024), 14 pages.
Wang, Bing, et al., "MAC SQL A Multi Agent Collaborative Framework for Text to SQL", (Feb. 15, 2024), 16 pages.
"U.S. Appl. No. 19/038,873, Examiner Interview Summary mailed Mar. 19, 2026", 2 pgs.
"U.S. Appl. No. 19/038,873, Response filed Mar. 18, 2026 to Non Final Office Action mailed Dec 22, 2025", 20 pgs.
Engineering At Zafin, "Bridging the Gap: Exploring use of Natural Language to interact with Complex Systems", [Online] Retrieved from the internet: <https://medium.com/engineering-zafi n/bridging-the-gap-exploring-using-natural-language-to-interact-with-complex-systems-11c1b056cc19>, (Aug. 15, 2023), 23 pages.
Eusebius, Nitin, et al., "Generating value from enterprise data: Best practices for Text2SQL and generative AI", [online]. Retrieved from the Internet: <URL:https://aws.amazon.com/blogs/machine-learning/generating-value-from-enterprise-data-best-practices-for-text2sql-and-generative-ai/>, (Jan. 4, 2024), 6 pages.
"U.S. Appl. No. 19/038,873, Notice of Allowance mailed May 28, 2026", 9 pages.
"U.S. Appl. No. 19/038,873, Corrected Notice of Allowability mailed Jul. 22, 2026", 2 pages.

* cited by examiner

LLM-GENERATED TEXT-TO-SQL VERIFICATION VIA DIRECTIONAL GRAPHS

PRIORITY CLAIM

This application claims the benefit of priority to U.S. Provisional Patent Application Ser. No. 63/719,579, filed Nov. 12, 2024, the contents of which are incorporated herein by reference.

TECHNICAL FIELD

Embodiments of the disclosure relate generally to cloud data platforms and, more specifically, to LLM-generated text-to-SQL verification via directional graphs.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to types of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form.

BRIEF DESCRIPTION OF THE SEVERAL VIEWS OF THE DRAWINGS

The present disclosure will be apparent from the following more particular description of examples of embodiments of the technology, as illustrated in the accompanying drawings. The drawings are not necessarily to scale, emphasis instead being placed upon illustrating embodiments of the present disclosure. In the drawings, like numerals may describe similar components in different views. Like numerals having different letter suffixes may represent different instances of similar components. Various ones of the appended drawings merely illustrate example embodiments of the present disclosure and should not be considered as limiting its scope.

DETAILED DESCRIPTION

Figure 1:
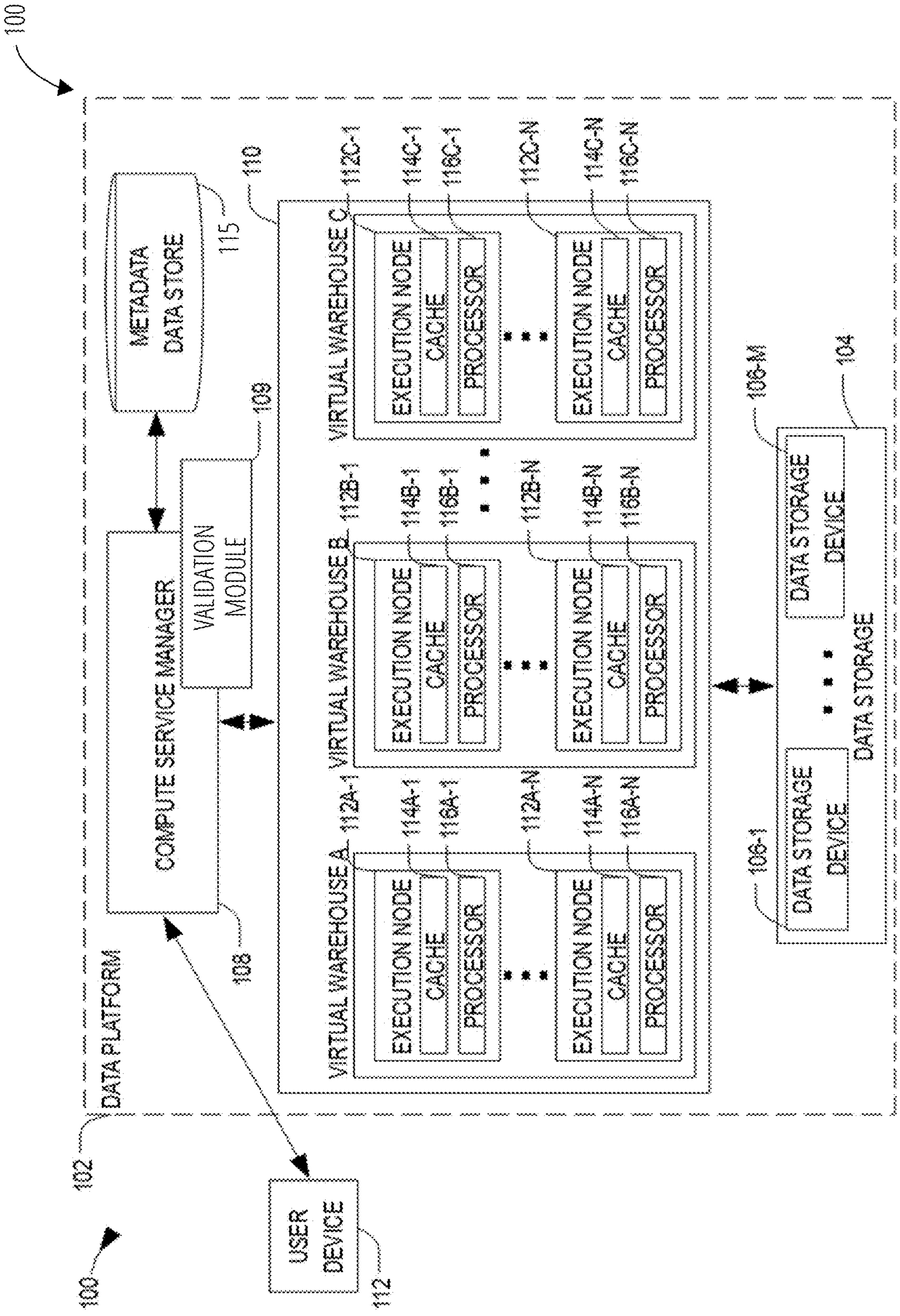
FIG. 1 illustrates an example computing environment that includes a cloud data platform, according to some examples.

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. For the purposes of this description, the phrase "cloud data platform" may be referred to as and used interchangeably with the phrases "a network-based database system," "a database system," or merely "a platform."

In the present disclosure, physical units of data that are stored in a data platform—and that make up the content of, e.g., database tables in user accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, on, etc.) what is referred to herein as an "internal storage location." If stored external to the data platform, a given file is referred to herein as an "external file" and is referred to as being stored in (or at, on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a user account. The data platform may include one or more databases that are respectively maintained in association with any number of user accounts (e.g., accounts of one or more data providers or other types of users), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular user accounts as well. Users and/or executing processes that are associated with a given user account may, via one or more types of clients, be able to cause data to be ingested into the database, and may also be able to manipulate the data, add additional data, remove data, run queries against the data, generate views of the data, and so forth.

In an implementation of a data platform, a given database (e.g., a database maintained for a user account) may reside as an object within, e.g., a user account, which may also include one or more other objects (e.g., users, roles, privileges, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

A data platform (e.g., database system) can support data storage for one or more different organizations (e.g., customer organizations, which can be individual companies or business entities), where each individual organization can have one or more accounts (e.g., customer accounts) associated with the individual organizations, and each account can have one or more users (e.g., unique usernames or logins with associated authentication information). Additionally, an individual account can have one or more users that are designated as an administrator for the individual account. An individual account of an organization can be associated with a specific cloud platform (e.g., cloud-storage platform, such as such as AMAZON WEB SERVICES™ (AWS™) MICROSOFT® AZURE®, GOOGLE CLOUD PLATFORM™), one or more servers or data centers servicing a specific region (e.g., geographic regions such as North America, South America, Europe, Middle East, Asia, the Pacific, etc.), a specific version of a data platform, or a combination thereof. A user of an individual account can be unique to the account. Additionally, a data platform can use an organization data object to link accounts associated with (e.g., owned by) an organization, which can facilitate management of objects associated with the organization, account management, billing, replication, failover/failback, data sharing within the organization, and the like.

Traditional systems generate SQL queries from natural language inputs, but with several limitations and deficiencies that impact the overall accuracy, efficiency, and adaptability of the process. These systems often rely on rule-based approaches or basic natural language processing (NLP) techniques that struggle with complex query requirements, dynamic validation, and real-time user feedback.

Traditional systems generally validate the SQL query only after the entire query has been generated. This approach means that any issues, such as double counting or incorrect joins, are only detected at the end of the process. Correcting these errors requires significant rework, often involving re-generating or modifying the entire query structure.

Without real-time validation, errors introduced at the beginning of the query generation process can accumulate, compounding throughout the query. By the time validation is applied, the accumulated errors may require extensive adjustments, making the system inefficient and prone to error.

Traditional systems also struggle with complex relationships, such as one-to-many and many-to-many joins, which are common in databases with normalized data structures. These systems may fail to interpret how different tables relate to one another accurately, leading to incorrect join paths or aggregation errors.

Double counting is a common issue in traditional systems, especially when multiple tables with different granularities are involved. Without advanced validation or understanding of the data schema, these systems frequently produce SQL queries that aggregate data incorrectly, leading to inflated or misleading results.

Many traditional systems use static rules or templates to generate SQL queries. These predefined templates lack flexibility and often require manual adjustments to handle variations in natural language queries or changes in the database schema.

Because rule-based systems rely on predefined patterns, they struggle with the diversity of natural language expressions. Minor changes in query phrasing or synonyms may result in misinterpretations or errors, leading to inaccurate SQL generation.

Databases are dynamic, with schema changes, table updates, and relationship adjustments occurring over time. Traditional systems require frequent manual updates to remain compatible with these changes, as they lack adaptive mechanisms to understand schema alterations automatically.

Traditional SQL generation approaches struggle with hierarchical data structures, such as roll-ups across multiple dimensions (e.g., customer, region, and product categories). Without the capability to recognize and adapt to different levels of granularity in real-time, these systems often generate incorrect queries or require extensive manual intervention to handle multilevel relationships.

Traditional systems generally lack mechanisms to detect and prevent double counting within queries that involve multiple tables with different cardinalities. Without automated checks for double counting, these systems produce results that may inaccurately inflate totals or averages, leading to unreliable data insights.

When aggregating data across related tables, traditional systems often fail to adjust aggregation logic dynamically based on relationship types (e.g., many-to-one or one-to-many). This deficiency often results in queries that apply aggregations at inappropriate levels, further increasing the risk of inaccurate calculations.

Traditional systems typically generate SQL as a single output, with no mechanism for iterative refinement based on user feedback or validation results. Users must either accept the generated query as-is or manually correct errors, which can be time-consuming and impractical for complex queries.

Because traditional systems operate in a single-pass, non-interactive mode, users can't influence the query as it's being generated. This limitation reduces the system's ability to adapt to real-time changes in user intent or to correct misinterpretations dynamically.

Because validation and correction occur after the query generation is complete, any adjustments require re-processing the entire SQL structure. This inefficiency leads to significant delays, especially for complex queries.

Traditional systems often produce SQL queries that are not optimized for performance, especially when handling joins or aggregations across large tables. Without real-time validation to catch inefficient query structures, these systems may generate SQL that is slow and resource-intensive to execute.

Aspects of the present disclosure address the foregoing issues, among others, with a data platform, systems, methods, and devices that leverage advanced machine learning models, real-time validation, and an interactive feedback loop with large language models (LLMs). These innovations allow the data platform to dynamically adapt to complex queries, prevent errors like double counting, and efficiently respond to variations in user intent, significantly enhancing accuracy, scalability, and user experience.

Unlike traditional systems that validate only after the SQL query is fully generated, the data platform validates the SQL query as it is being generated, performing real-time parsing, graph construction, and relationship validation. With each incremental piece of the query generated by the LLM, the platform checks for structural and logical integrity, including correct joins, aggregations, and grouping levels.

When the platform detects a potential issue, such as an aggregation error or incorrect join, the data platform sends immediate feedback to the LLM, which then adjusts the query generation process in real-time. This ongoing feedback loop allows for continuous refinement, significantly reducing the chances of errors accumulating throughout the query generation.

The data platform creates a directed graph to represent relationships between tables, such as one-to-one, one-to-many, and many-to-many. This directed graph allows the platform to map data dependencies accurately, ensuring that complex joins are handled correctly.

By using the directed graph to understand data relationships, the data platform validates that each join and aggregation aligns with the underlying schema, preventing misinterpretation of many-to-one and one-to-many relationships. This dynamic relationship management prevents issues like double counting and incorrect aggregation paths that traditional systems often struggle with.

The data platform uses an LLM to generate SQL based on the natural language query. Unlike traditional rule-based systems, the LLM adapts to different phrasings, contexts, and user intents, dynamically generating SQL that aligns closely with the query's meaning.

The LLM can generate intermediary query structures or pseudo SQL, which the data platform uses as a scaffold for validation and adjustment. This flexibility allows different modules to refine specific parts of the query incrementally, adapting to complex or nested query requirements that rule-based systems cannot handle effectively.

The data platform dynamically pulls schema metadata, including table structures, relationships, and constraints, to inform SQL generation. This automatic schema adaptation allows the data platform to accommodate database updates, new relationships, or modified fields without requiring manual rule changes.

The data platform can adjust to hierarchical data structures by interpreting levels of granularity and adapting join and aggregation logic accordingly. This adaptability allows the system to work with complex queries that involve multi-level relationships and hierarchical roll-ups, a challenge for traditional systems.

The data platform generates an undirected graph to represent initial relationships among data sources without enforcing specific directions. As the LLM generates parts of the SQL query, the data platform constructs this undirected graph by adding nodes for data sources (e.g., tables) and edges for relationships (e.g., joins) between them, reflecting how tables connect within the query.

By converting the undirected graph into a directed graph with specific relationship types, the data platform identifies high-risk areas for double counting based on the data hierarchy. The data platform validates aggregations to ensure they align with many-to-one or one-to-many relationships, reducing the risk of summing or counting duplicate entries.

When potential double counting risks are detected, the data platform provides feedback to the LLM, prompting adjustments such as adding DISTINCT to a count function or refining the grouping level. In some cases, the feedback is immediate and this immediate feedback allows the LLM to make necessary adjustments mid-generation, ensuring accurate aggregation results.

By providing incremental feedback to the LLM, the data platform supports a dynamic, iterative SQL generation process. Users can interact with the query generation, influencing adjustments based on real-time validation feedback, significantly enhancing query customization and precision.

If the data platform detects a misinterpretation in query intent based on validation checks, it can adjust the LLM's output immediately, ensuring that the generated SQL aligns closely with what the user originally requested. This responsiveness improves accuracy, especially for complex or nuanced queries.

During real-time validation, the data platform identifies and adjusts inefficient query structures. For example, the data platform may suggest optimized joins, subqueries, or alternative aggregations that reduce processing time on large datasets.

By generating and validating SQL incrementally, the data platform produces queries optimized for scalability, minimizing resource usage. Traditional systems often produce rigid, inefficient SQL, but the data platform's dynamic approach helps ensure performance is maintained even with complex, multi-table queries.

FIG. 1 illustrates an example computing environment 100 that includes a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata data store 115, an execution platform 110, and data storage 104. The cloud data platform 102 (e.g., LLMs running on the GPUs) hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources including storage devices within the data storage 104. The data storage 104 comprises a plurality of computing machines and provides on-demand computer system resources such as data storage and computing power to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 115. The metadata data store 115 stores metadata pertaining to various functions and aspects associated with the cloud data platform 102 and its users. The metadata data store 115 also includes a summary of data stored in data storage 104 as well as data available from local caches. Additionally, the metadata data store 115 includes information regarding how data is organized in the data storage 104 and the local caches.

As shown, the compute service manager 108 includes a validation module 109 that is responsible for assessing the accuracy, structure, and logic of the SQL query generated by the LLM in real time. As the SQL is incrementally generated, the module performs ongoing checks to ensure that joins, aggregations, and groupings align with the database schema and user intent. The module dynamically constructs an undirected graph to represent initial relationships, converts the undirected graph into a directed graph with annotations (e.g., one-to-one, many-to-one) to define data dependencies, and examines each relationship for potential issues like double counting or aggregation errors. If any discrepancies are detected, such as a join condition that risks duplicating records or an aggregation that doesn't fit the intended data hierarchy, the validation module provides immediate feedback to the LLM. This iterative feedback allows for real-time corrections, ensuring the final SQL query is both accurate and optimized for execution. Further details of the operation of the validation module 109 are discussed below.

The compute service manager 108 is also in communication with a user device 112. The user device 112 corresponds to a user of one of the multiple client accounts supported by the cloud data platform 102. In some implementations, the compute service manager 108 does not receive any direct communications from the user device 112 and only receives communications concerning jobs from a queue within the cloud data platform 102.

The compute service manager 108 is also coupled to the metadata data store 115. The metadata data store 115 stores metadata pertaining to various functions and aspects associated with the cloud data platform 102 and its users. The metadata data store 115 also includes a summary of data stored in data storage 104 as well as data available from local caches. Additionally, the metadata data store 115 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution nodes 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems (HDFS)), object storage systems, and the like. In some examples, the storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 1. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 1 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage devices 106-1 to 106-M are decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 115 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata data store 115, execution platform 110, and data storage 104 are shown in FIG. 1 as individual discrete components. However, each of the compute service manager 108, metadata data store 115, execution platform 110, and data storage 104 may be implemented as a distributed system (e.g., distributed across multiple systems/platforms at multiple geographic locations). Additionally, each of the compute service manager 108, metadata data store 115, execution platform 110, and data storage 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from, and store data to, any of the data storage resources in the data storage 104.

Figure 2:
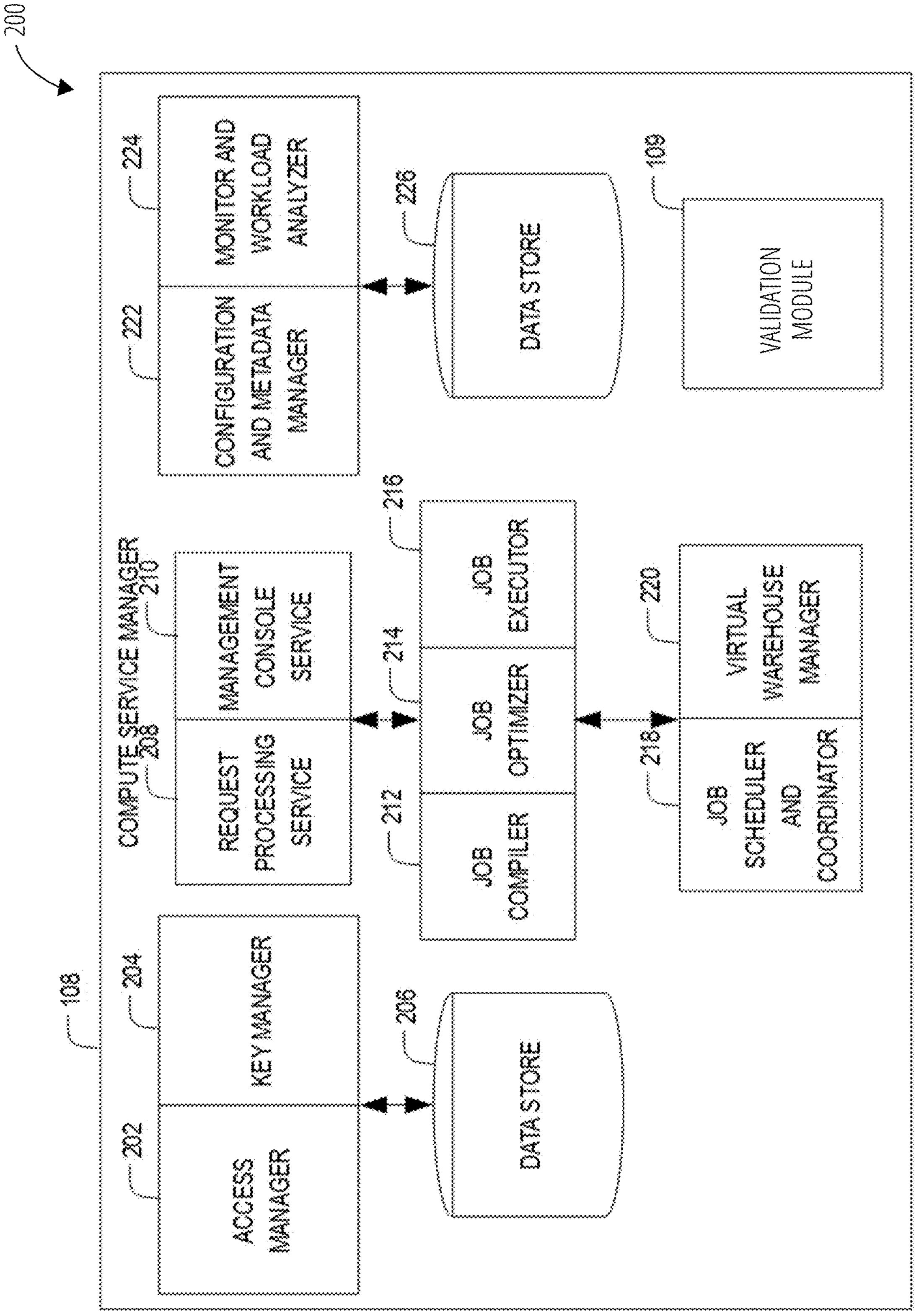
FIG. 2 is a block diagram illustrating components of a compute service manager of the cloud data platform, according to some examples.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data store 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the cloud data platform 102. For example, data store 226 may represent caches in execution platform 110, storage devices in data storage 104, the metadata data store 115, or any other storage device or system.

In addition, as mentioned above, the compute service manager 108 includes a validation module 109 that is responsible for assessing the accuracy, structure, and logic of the SQL query generated by the LLM in real time. Further details regarding the functionality of the validation module 109 are discussed below.

Figure 3:
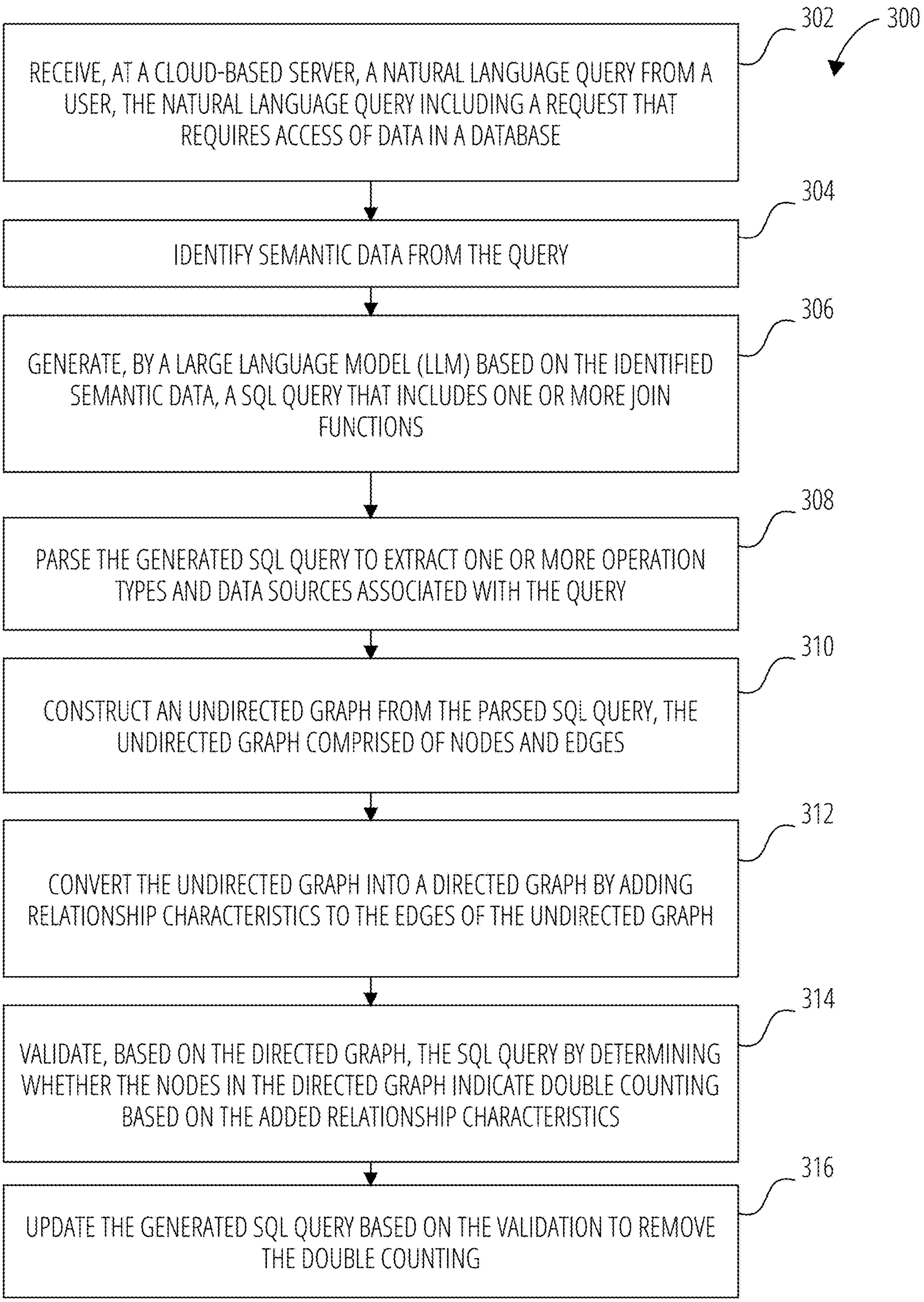
FIG. 3 illustrates an example method for validating text-to-SQL generated by an LLM, according to some examples.

FIG. 3 illustrates an example method 300 for validating text-to-SQL generated by an LLM, according to some examples. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

At block 302, the data platform receives, at a cloud-based server, a natural language query from a user, the natural language query including a request that requires access of data in a database. The data platform receives, from a user, an interactive request via a communication interface of a data platform. The interactive request can comprise a question requesting a response from the communication interface. The user can be engaging with the platform through a communication interface, such as a chat window in a web-based chat interface, a messaging application, a voice assistant interface, and/or the like.

This interaction can occur in real-time, where the user expects a quick, interactive response from the platform. The interface can capture the user's input and identify whether the input includes simple text to more complex requests.

The data platform initiates a chat message comprising a user interface configured to receive prompts from a first user. The data platform initiates display of the interactive component through which users can input their queries or commands, allowing the system to interact with the users effectively.

The UI is configured to receive multiple types of inputs from the user. These inputs can include text queries, commands, voice inputs, or the like depending on the configuration of the data platform. The platform manages user sessions and prompts to maintain context throughout the interaction. This includes tracking the history of prompts and responses, enabling a seamless conversational flow.

In some cases, the UI is accessed by a third party system such as via an API without having to use the data platform's front end user interface.

The UI includes an input field where users can type their queries or commands. This field may include features such as autocomplete suggestions and error correction to enhance user experience. Autocomplete suggestions help users by predicting the rest of their query as they type, speeding up the input process and reducing errors. The data platform can maintain a database of commonly asked questions and phrases relevant to the domain of the chat application. This database can be built from historical data of similar users or the particular user, or designed based on anticipated user needs.

In some embodiments, the data platform uses predictive text algorithms that analyze the initial characters typed by the user and match them with the most likely completions from the database. These predictive text algorithms can leverage machine learning models trained on a large corpus of text to improve prediction accuracy. The data platform can execute real-time processing to provide suggestions instantly as the user types.

The user interface can include an area where responses generated by the system are displayed. This area updates dynamically as the conversation progresses. The user interface can include interaction buttons for common actions such as submitting a query, clearing the input field, or accessing help and support.

The data platform can receive a plurality of prompts from the user, the plurality of prompts comprising a first query. The data platform is designed to handle multiple user inputs, or "prompts," that collectively form a history of queries from the user. The data platform maintains a session for each user, tracking the sequence of prompts within a conversation.

The series of prompts provided by the user give context to subsequent prompts. Each prompt is stored in a database or in-memory data structure, indexed by session ID and timestamp. This ensures that the order of prompts is preserved, which is essential for understanding context.

As the user enters prompts, the system processes each one in real-time, appending the latest prompt to the current session's context. This immediate processing allows for dynamic interactions and adjustments based on new inputs. As an example, if a user is interacting with a financial data platform and the user's prompts are as follows: Prompt 1: "Show me the quarterly earnings for Q1 2023." Prompt 2: "How does this compare to the previous quarter?" Prompt 3: "And what about the same quarter last year?" In this example, the data platform receives three prompts that collectively provide context for a more comprehensive query about quarterly earnings and their comparisons over different periods.

The data platform assesses prompts to identify a query. In some embodiments, the data platform also categorizes the prompts. This categorization process helps the data platform to determine whether the prompt requires data retrieval from a third-party dataset or if the prompt can be responded to by an LLM directly.

For example, the data platform classifies the prompts into three distinct categories. The first category can include a conversational prompt that do not require any search or retrieval from an indexed database. For instance, greetings or simple expressions of courtesy fall into this category. When a prompt is categorized as such a pleasantry, the data platform can immediately request an LLM to provide a quick and fast response, ensuring a seamless conversational flow without unnecessary delays.

Prompt categories can include a dataset-specific question, where these prompts specifically ask for information that needs to be retrieved from a database. For example, if a user queries specific data points or trends within a dataset, the system recognizes the need for database retrieval to generate an accurate response. In this case, the system initiates the necessary search processes, as further described herein, to fetch the relevant data from the indexed tables or databases.

Prompt categories can include questions on metadata, where this category includes queries about the dataset's metadata or general knowledge about the data. For example, if a user asks about the type of data available or how to interact with the dataset, the system categorizes such prompts as a metadata question. This type of prompt involves providing information about the dataset's structure, available fields, or how to perform specific queries, and as such, initiates the necessary search processes, as further described herein.

To efficiently handle this categorization, the data platform can apply a separate machine learning model, such as a smaller LLM, which specializes in classifying prompts into these categories. By leveraging this categorization step, the data platform can quickly determine the appropriate action for each prompt. If a prompt is classified as a pleasantry, the system can bypass the search index and directly generate a response using the LLM. For dataset-specific questions and metadata inquiries, the system proceeds with the document or text retrieval processes as described herein, ensuring that users receive accurate and relevant information based on their queries.

At block 304, the data platform identifies semantic data from the query. Semantic data includes key pieces of information embedded within the natural language query that convey the meaning, intent, and/or structure necessary to generate SQL. For example, the semantic data can include data fields such as specific columns or attributes the user wants to retrieve, filter, or aggregate, such as “total sales” or “customer names.”

Semantic data can include relationships such as references to how data tables or elements are related, for example, understanding that “sales” data should link to “customer” data through a common identifier like customer ID. Semantic data can include operations data including high-level instructions implied in the query, such as aggregations (e.g., SUM, COUNT), filtering conditions (e.g., “last month”), and grouping actions (e.g., grouping sales by region). Semantic data can include a type of relationship, such as many-to-one or one-to-one (as further described herein).

In some cases, the data platform uses a machine learning model or an LLM to analyze the natural language query and identify semantic data within it. The LLM can be trained to parse and recognize specific patterns and structures typical in queries related to databases, such as identifying metrics and dimensions by recognizing phrases that imply numerical aggregations (like “total” or “average”) or categorizations (like “by product” or “for each customer”) or decoding relationships by detecting the presence of joins or links between tables based on context, such as “show orders for each customer,” which implies a relationship between “orders” and “customers.”

In some cases, to accurately identify semantic data, the data platform references a schema or metadata associated with the data store. This schema provides structural information on table names and fields such as knowledge of available tables (e.g., “customers,” “orders”) and their fields (e.g., “order date,” “customer name”) helps map the query’s language to actual database elements. In some cases, the schema includes relationships between tables where schema information clarifies which tables are directly or indirectly related, guiding the identification of potential joins or data pathways needed to fulfill the query.

If the natural language query doesn’t specify exact tables or fields, the data platform can infer the tables or fields based on context. For instance, if a query simply asks for “total sales,” the data platform may assess the most relevant “sales” table in the database without further input. The LLM may use historical queries, metadata tags, or user roles to prioritize certain tables or views when multiple options exist.

Once extracted, the semantic data is prepared in a structured format that the data platform can later input into an SQL generation process, such as by defining specific tables, columns, joins, and any aggregation rules required by the query. The data platform ensures that relevant data points and relationships within the natural language query are understood and organized.

At block 306, the data platform generates, by a large language model (LLM) based on the identified semantic data, a SQL query that includes one or more join functions. The LLM takes the semantic data identified in earlier steps as its input. This data provides a structured representation of the user’s intent, including key fields, tables, and any relationships needed to formulate the SQL query.

The LLM, pre-trained on a mixture of natural language and SQL syntax, leverages this training to construct an SQL query. The LLM is trained using expected SQL format and logic, and thus, translates semantic requirements directly into SQL statements.

Based on the semantic data, the LLM determines where join functions are necessary to fulfill the query’s requirements. For instance, if the semantic data specifies attributes from multiple tables, the LLM incorporates appropriate join statements.

The LLM includes joins that link these tables but may not join correctly, and thus the data platform verifies such SQL queries, ensuring that they align with the natural relationships between the fields specified. This allows for the accurate retrieval of data from multiple sources as defined by the user’s request.

The LLM organizes the SQL query into an SQL structure, with joins integrated within clauses such as FROM and WHERE as needed. The LLM is trained to generate this structure that complies with SQL standards, ensuring that the generated query can be executed by the database without syntax errors. The completed SQL query, including all necessary joins and clauses, is then output by the LLM.

At block 308, the data platform parses the generated SQL query to extract one or more operation types and data sources associated with the query. The data platform parses the SQL query into distinct components by analyzing the syntax of the SQL, identifying keywords, clauses, and structural elements in the query to build a clear map of its logic.

In some cases, during parsing, the SQL query can be broken down (or tokenized) into individual parts (e.g., SELECT, JOIN, SUM, FROM, WHERE, WITH) and/or process Common Table Expressions (CTEs). These tokens are then arranged into a syntax tree that reflects the query’s logical flow, making it easier to identify each component and operation.

For CTEs, tokens following the WITH clause are parsed to identify and isolate each CTE as a standalone component, which is then integrated into a syntax tree that organizes the logical flow of the query. This structure makes it easier to track dependencies and operations within each CTE, ensuring they are correctly linked to the main query while maintaining clarity on the query’s overall execution path.

In some cases, the data platform extracts operation types that include specific actions or functions within the SQL query, such as SELECT, JOIN, GROUP BY, SUM, and WHERE. These operations define how data will be selected, joined, filtered, or aggregated.

The data platform examines the query structure to categorize the main operations. For example, the data platform can categorize a selection operations by identifying columns and fields being retrieved in the SELECT clause, aggregation operations by recognizing any aggregate functions like SUM, COUNT, AVG, which impact how data is summarized, filter operations by detecting filtering criteria specified in the WHERE clause, which define any constraints or conditions on the data, grouping and ordering functions by identifying grouping operations in GROUP BY and ordering in ORDER BY to understand how data is structured in the final result, and/or the like. The data platform tags each operation type to build a detailed profile of the query’s logic, which will later support validation steps.

The data platform can scan the FROM clause and any join statements to determine the specific tables, views, or other data sources that the query references. Each data source can be mapped to its corresponding operation within the query. For example, a JOIN operation can have specific tables associated with it, helping the data platform understand where each operation is drawing its data from.

By cataloging each table and view involved in the query, the data platform creates a data source map that outlines all referenced sources and the relationships implied by their use in joins. The platform builds a relationship map showing which operations are applied to which data sources. For example, if SUM(sales) appears in the SELECT clause and sales originates from the sales_data table, this relationship is noted. The data platform identifies any JOIN statements and their conditions (e.g., ON clauses) to understand how tables are linked.

After parsing, the data platform can output a structured representation of the query, detailing the types of operations, their associated data sources, and the relationships between tables.

At block 310, the data platform constructs an undirected graph from the parsed SQL query. The undirected graph can be comprised of nodes and edges. The nodes can represent data sources, and the edges can represent operations linking the data sources including the one or more join functions.

This undirected graph can simplify the complexity of multi-table joins and operations by representing data sources and relationships in a way that can later be validated for correctness. The undirected graph acts as an abstract model of the SQL query, representing tables and relationships without imposing a directional flow, which keeps the initial structure neutral. This neutrality allows the platform to evaluate basic relationships before any directional dependencies (like many-to-one relationships) are introduced.

Each node in the undirected graph can represent a unique data source referenced in the SQL query. A data source can include a table, view, or any defined structure within the database from which data is pulled.

The nodes can be created based on the tables and views identified during the SQL query parsing step (Block 308). For example, if the query involves tables named sales, customers, and regions, each of these tables becomes an individual node in the graph.

Each node (and/or columns and calculated expressions) may be labeled with attributes such as table or view name to indicate which specific database entity the node represents, primary keys of each table may be tagged within the node to highlight potential keys for joining with other nodes, role or category where nodes can be annotated with roles, such as "fact" or "dimension," which are useful for understanding the type of data they contain, node creation as a visual map of data sources such as a high-level overview of all data sources in the query, and/or the like.

Edges in the undirected graph can represent the operations linking nodes. In SQL, this can include join operations that connect tables based on shared keys. The JOIN clauses in the SQL query can be transformed into an edge between two nodes. For example, if the query includes sales JOIN customers ON sales.customer_id=customers.customer_id, an edge is created between the sales and customers nodes.

While joins can be one type of edge, other relationships may also be included, depending on query complexity. For instance, an edge may represent relationships in subqueries or derived tables if they exist within the query.

Each edge may contain specific information. For example, an edge can include join keys that are used in the join condition (e.g., customer_id), an operation type where edges can still be annotated to indicate whether they're associated with an INNER JOIN, LEFT JOIN, or another join type, even if direction is not yet implied, or other undirected natures of edges that don't specify a "primary" or "secondary" data source.

An example SQL Query can include

SELECT region_name, SUM(sales_amount)

FROM sales

JOIN customers ON sales.customer_id customers.customer_id

JOIN regions ON customers.region_id=regions.region_id

GROUP BY region_name;

The data platform can generate an undirected graph by creating three nodes for sales, customers, and regions, and an edge between sales and customers, representing the join on customer_id and another edge between customers and regions, representing the join on region_id.

The graph can include the three connected nodes with undirected edges linking sales to customers and customers to regions. The undirected graph can represent a complete map of data sources (nodes) and their relationships (edges) based on the parsed SQL query.

At block 312, the data platform converts the undirected graph into a directed graph. The data platform can convert the undirected graph into a directed graph by adding relationship characteristics to the edges of the undirected graph. This step introduces directionality to the relationships between nodes, indicating how data flows between tables, such as adding many-to-one, one-to-one, many-to-many, or one-to-many relationships.

When converting the undirected graph to a directed graph, the data platform can determine the specific relationship types (such as many-to-one or one-to-many) for each edge, including relationships between derived entities like Common Table Expressions (CTEs), which don't have explicit relationships predefined by the database schema. To achieve this, the data platform applies an algorithm that infers relationships based on characteristics of the data and operations defined within each CTE, as well as how the CTEs are used within the main query.

The algorithm examines join conditions and filters applied in each CTE and how they relate to other tables or CTEs within the main query. For instance, if a CTE performs an aggregation and is joined to another CTE or table using a primary key, the algorithm may infer a many-to-one relationship.

Aggregation functions within a CTE (e.g., SUM, COUNT) indicate changes in data granularity. If a CTE aggregates data by grouping on a specific key, and this CTE is then joined with a table or another CTE based on that key, the algorithm may infer a one-to-many relationship.

If any keys or columns within the CTEs correspond to foreign keys or primary keys in the underlying schema, the platform uses this metadata to validate or suggest potential relationships. For example, if customer_id appears in both a CTE and a main table, and customer_id is a primary key in the main table, the platform may infer a one-to-one relationship when both CTE and table are aggregated to unique customer_ids.

The algorithm employs pattern recognition to classify common CTE operations. For example, CTEs that derive summary statistics or perform complex joins may suggest a many-to-many relationship if both sides of the join connect multiple rows.

The directed graph introduces directionality to the previously neutral relationships in the undirected graph. Directional edges clarify the data hierarchy and dependency paths, which is essential for identifying potential issues such as double counting and ensuring correct aggregations.

Converting to a directed graph enables the platform to validate the SQL query against expected data relationships. For instance, in many-to-one relationships, data from a "many" side (e.g., transactions) is aggregated toward a "one" side (e.g., customers), and this flow needs to be accurately represented to prevent errors in the SQL query.

In this step, the data platform analyzes the relationships implied by the SQL joins, categorizing (and/or merging)

them to understand which directionality is appropriate. A one-to-one relationship indicates a unique match between records in both tables. A one-to-many relationship represents a scenario where each record in the "one" table matches multiple records in the "many" table. For example, each customer has multiple orders.

A many-to-one relationship indicates the inverse relationship, where multiple records in one table link to a single record in another. For example, each order may link to a single customer. A many-to-many relationship represents complex relationships requiring a bridge table to maintain unique relationships, such as students enrolled in courses.

The data platform may reference the database schema to retrieve foreign key constraints or unique key definitions. For instance a foreign key constraint from orders.customer_id to customers.customer_id suggests a many-to-one relationship, where each order maps to one customer, but each customer may have multiple orders.

Once relationships are identified, each edge in the undirected graph is converted into a directed edge to reflect the flow of data. In some cases, for one-to-many relationships, the direction points from the "many" node to the "one" node, and/or vice versa. For example, an edge would point from customers to orders. for many-to-one relationships, the direction points from the "many" node to the "one" node. For instance, an edge would point from orders to customers.

In some cases, each edge is annotated with information relevant to the relationship, such as a join condition that identifies the specific columns used in the join (e.g., customer_id), a cardinality relationship that tags indicating relationship type (e.g., "many-to-one") to provide clear context for subsequent validation steps, and/or an aggregation relevance that marks edges where aggregations occur along a relationship, aiding in the detection of potential double counting.

An Example SQL Query includes:

```
SELECT customer_name, SUM(order_total)
FROM customers
JOIN orders ON
  customers.customer_id=orders.customer_id
GROUP BY customer_name;
```

The undirected graph initially is created with nodes for customers and orders. The undirected edge connects customers and orders, representing the join on customer_id.

The data platform transforms this undirected graph into a directed graph. Based on the schema and join condition, the platform identifies a one-to-many relationship, where each customer has multiple orders. The edge is directed from orders to customers, indicating the one-to-many flow. The edge is labeled with customer_id as the join key and "one-to-many" as the relationship type.

The data platform now has a fully directed graph with nodes representing one or more data sources and directed edges annotated with relationship characteristics. This directed graph serves as a robust framework for validating the SQL query in subsequent steps.

At block 314, the data platform validates, based on the directed graph, the SQL query. The data platform can determine whether the nodes in the directed graph indicate double counting based on the added relationship characteristics, aggregations presented in the query, calculations, and/or the like, such as the aggregation SUM operation. The data platform performs validation on the SQL query using the directed graph with a focus on detecting and preventing double counting issues.

Double counting is a common issue in multi-table joins, especially in queries involving aggregations across relationships with varying granularities (e.g., one-to-many or many-to-one). This step verifies that the SQL query avoids aggregating data in a way that would result in inflated totals or duplicate counts.

The directed graph's edges indicate data flow and relationships, such as many-to-one or one-to-many, allowing the platform to identify where aggregations could lead to double counting. This directed information is used to help distinguish how data sources are interrelated, which is then used for validating correct aggregation paths.

Double counting can occur when data from the "many" side of a relationship is aggregated in a way that causes records to be counted more than once, often due to incorrect handling of join relationships or improper aggregation techniques.

Double counting can lead to inaccuracies in key metrics, such as total sales, average values, or counts, resulting in misleading insights. For example, summing order_amount in an orders table that's joined with a customers table may inadvertently duplicate customer values if customer data is used in aggregation without considering the relationship type.

Double counting can lead to inaccuracies in key metrics, such as total sales, average values, or counts, resulting in misleading insights. For example, summing order_amount in an orders table that's joined with a customers table may inadvertently duplicate customer values if customer data is used in aggregation without considering the relationship type. This issue becomes even more pronounced in scenarios involving multiple joins. For instance, if the customers table is also joined with a regions table, and we attempt to calculate both SUM(order_amount) from orders and SUM (customer.balance) from customers, grouping by region_name could cause each customer's balance to be counted multiple times for each associated order. This results in inflated customer balance totals within each region, highlighting the importance of correctly managing aggregation across complex relationships to avoid double counting errors.

Each node in the directed graph represents a data source (e.g., a table), and edges represent relationships between these data sources (e.g., joins). The platform examines the nodes and their connections to assess potential aggregation issues.

Fact tables contain measurable quantities, such as sales or transactions, while dimension tables hold descriptive data, such as customer details or regions. Recognizing these types helps the platform validate whether aggregations align correctly with the table roles.

Fact tables can store quantitative data or measurable events (e.g., sales, transactions, or clicks). These tables contain metrics that are often aggregated, such as total_sales, order_quantity, or revenue. Fact tables tend to have a lower granularity because they record individual events or transactions, with each row representing a single instance of an action or a specific measure.

In contrast, dimension tables store descriptive data related to the facts, providing context and categorization for analysis. Dimension tables can include customer information, product details, locations, or time periods. Dimension tables have higher granularity than fact tables because they contain more static data that categorizes or describes facts, with each row representing a unique entity (e.g., a unique customer or product).

Recognizing which tables are facts and which are dimensions helps the data platform to identify the natural hierarchy and join relationships. Typically, fact tables join with one or more dimension tables to enrich the quantitative data with descriptive attributes. For example, in a sales database, a sales fact table could join to a customers dimension table via a customer_id key, representing a many-to-one relationship from sales to customers.

Aggregations are often performed on measures in fact tables (e.g., summing order_total in the sales table). Knowing which table is the fact table helps ensure that aggregations align correctly with the granularity of data.

Aggregating measures in a dimension table and/or fact tables, however, could lead to incorrect results because dimension tables generally don't contain quantitative metrics meant for aggregation (e.g., customer names or addresses should not be summed or averaged).

By restricting additive aggregations (e.g., SUM, COUNT) to fact tables, the data platform prevents unintentional double counting. Since fact tables have a lower granularity, they are intended to support aggregations, whereas dimension tables are not.

For instance, if an SQL query attempts to aggregate a measure across both sales (fact) and customers (dimension) without appropriate grouping, the SQL query may double count sales values by aggregating at the customer level instead of the sales event level.

Dimension tables are often used in group-by clauses to categorize fact data. By ensuring that dimension tables are grouped appropriately without aggregating measures in them, the platform validates that only the fact table's data is being aggregated.

For example, grouping sales data by region_name (from a regions dimension table) should be valid, but summing total_sales directly within the regions table could lead to incorrect results if not grouped by a primary key from the fact table.

Once fact and dimension tables are identified, their relationships are represented as directed edges in the graph. The direction of a join (e.g., many-to-one) can be inferred based on the fact table's lower granularity and the dimension table's role in categorizing data. The directed graph will show, for example, that sales (many) joins to customers (one), meaning aggregation must occur at the sales level if calculating total sales per customer, not the other way around.

The directed edges indicate one-to-many, many-to-one, or one-to-one relationships. For instance, if a sales table (many) joins with a customers table (one) via a directed edge from sales to customers, this implies that each customer can have multiple sales, which affects how aggregations should be handled.

The platform assesses aggregation functions, such as SUM, COUNT, or AVG, in the SQL query. For operations like SUM or COUNT, which add values across rows, the platform verifies that the aggregation doesn't lead to double counting by checking if the SQL query aligns with the granularity defined by the directed edges.

The directed graph helps the platform determine if aggregations are applied at the correct level. For example, aggregating sales at the customer level should not sum over the "many" side (sales records) without accounting for the grouping by customer.

The data platform checks that the join conditions (e.g., ON clauses) align with the directed relationships, confirming that the join keys correctly match between tables.

If the SQL query includes a GROUP BY clause, the data platform validates that the grouping level corresponds with the relationship types. For example, in a one-to-many relationship, grouping by the "one" side (e.g., customer_id in the customers table) is validated to prevent double counting of entries from the "many" side (e.g., multiple orders per customer).

As an SQL Query Example,

```
SELECT customers.customer_name, SUM(orders.order_total)
FROM customers
JOIN orders ON customers.customer_id=orders.customer_id
GROUP BY customers.customer_name;
```

In the directed graph for the query, nodes can include customers and orders where a directed edge can point from orders (many) to customers (one), indicating a many-to-one relationship.

Since orders is on the "many" side, aggregating order_total directly without grouping by customer_id could lead to double counting if, for instance, additional joins were introduced or if there was ambiguity in the aggregation path.

The GROUP BY customers.customer_name clause is verified to ensure that aggregation (SUM) is applied correctly across customers, avoiding repeated aggregation of order_total values. The directed edge confirms that each customer is associated with multiple orders, so summing order_total within each customer grouping is validated as correct.

If the platform detects a structure in the directed graph that might lead to double counting (e.g., aggregating on both the one and many sides without proper grouping), the data platform flags this as a potential issue. This warning triggers further checks and/or adjustments.

In some cases, the platform may automatically adjust the SQL query to correct double counting risks. For example, the data platform may refine the GROUP BY clause or adjust join conditions based on validated relationship paths.

At block 316, the data platform updates the generated SQL query based on the validation to remove the double counting. If the SQL query passes validation, the SQL query is marked as ready for execution. If any issues are detected, corrective measures or feedback are generated, which may involve modifying the SQL query or prompting for additional clarification.

The data platform takes corrective actions to update the SQL query, addressing any identified risks of double counting discovered during the validation process. This step ensures that the final SQL query aligns with the correct aggregation and join logic based on data relationships, resulting in an accurate and reliable query.

One approach involves rearranging nodes in the directed graph to reflect accurate relationships between tables and derived entities. For example, if the data platform detects that aggregations or joins are likely to result in double counting, the data platform can adjust the graph structure to enforce correct relationship paths, such as aligning many-to-one joins to ensure aggregations occur at the correct level. By modifying the graph structure, the data platform recalibrates data flow and dependencies, helping prevent errors from propagating in the query.

In addition to graph restructuring, the data platform can send detailed, targeted instructions to the LLM to prompt corrections within the SQL itself. These instructions specify exact issues identified during validation, such as double counting risks or improper grouping levels, and may include guidance on adjusting join conditions, modifying aggregation functions, or reordering GROUP BY clauses. By communicating these specific problems and corrective steps, the platform enables the LLM to refine the SQL query in real time, enhancing the precision and reliability of the final result. This dual correction method—graph rearrangement and interactive LLM feedback—ensures that the query aligns with both the user's intent and the underlying data structure.

The data platform prevents erroneous results caused by double counting, which can inflate aggregate values like sums or counts. Double counting typically occurs when measures are aggregated across inappropriate joins or groupings, especially in many-to-one relationships.

If validation reveals that the original SQL query is structured in a way that risks double counting, the data platform modifies the query to enforce accurate aggregation rules based on the underlying data structure and relationships.

The updates to the SQL query are based on the specific issues identified during validation. These adjustments may include modifying the join conditions, aggregation functions, grouping logic, or filtering criteria to align with the correct data relationships.

In cases where an INNER JOIN might inadvertently limit data or a LEFT JOIN may introduce duplicate entries from the "many" side of the join, the join type could be modified. The data platform can ensure that the join condition uses the correct keys (e.g., primary and foreign keys), which helps avoid unintended joins that lead to duplicate or omitted rows.

The SQL query may be updated to perform aggregations only on the fact table, preventing aggregations that mistakenly involve the dimension table and lead to double counting. For certain queries, adding the DISTINCT keyword to an aggregation function, such as COUNT(DISTINCT customer_id), prevents counting the same entity multiple times.

In some cases, the query can be corrected by introducing intermediate CTEs to control the order of joins and aggregations more precisely. Rather than joining all tables in a single SELECT clause, the platform can create a CTE that joins two tables initially, performing aggregations or filtering on this subset before joining it to additional tables. This approach rearranges the order of operations, allowing the platform to group and aggregate data incrementally, thereby reducing double counting risks and achieving more accurate results.

The platform may adjust the GROUP BY clause to align with the correct granularity level, grouping by attributes in dimension tables without aggregating them directly. The data platform can ensure that grouping is applied hierarchically, following the logical one-to-many relationship from dimension tables to fact tables.

For example, a query for aggregating sales by a customer is received where the original query includes:

```
SELECT customers.customer_name, SUM(orders.order_total)
FROM customers
LEFT JOIN orders ON customers.customer_id=orders.customer_id
GROUP BY customers.customer_name;
```

If customers and orders have a one-to-many relationship, this query may inadvertently double count order_total if additional joins or filtering on customers are added. The data platform updates the query to:

```
SELECT customers.customer_name, SUM(orders.order_total) AS total_sales
FROM customers
JOIN (SELECT customer_id, SUM(order_total) AS order_total FROM orders
GROUP BY customer_id) AS orders ON customers.customer_id=orders.customer_id GROUP BY customers.customer_name;
```

The update nests the aggregation of order_total within a subquery, ensuring that order_total is aggregated at the customer_id level before joining with customers. This prevents double counting by enforcing aggregation within the fact table itself.

In another example, a query for counting distinct customers across orders is received with the originally generated SQL query is:

```
SELECT regions.region_name, COUNT(orders.customer_id) AS total_customers
FROM regions
JOIN customers ON regions.region_id=customers.region_id
JOIN orders ON customers.customer_id=orders.customer_id
GROUP BY regions.region_name;
```

If customers place multiple orders, counting customer_id in orders could inflate the count, as each customer may appear multiple times in orders. As such, the data platform updates the SQL query to read:

```
SELECT regions.region_name, COUNT(DISTINCT customers.customer_id) AS total_customers
FROM regions
JOIN customers ON regions.region_id=customers.region_id
LEFT JOIN orders ON customers.customer_id=orders.customer_id
GROUP BY regions.region_name;
```

Adding DISTINCT to the COUNT function ensures each customer is counted only once per region, preventing duplicate counts due to multiple orders by the same customer.

The data platform may automatically identify which parts of the query structure need adjustment, particularly when patterns of double counting are commonly associated with certain join or aggregation patterns.

The platform may iteratively adjust and revalidate the query, making small modifications and checking each change's impact on the structure and accuracy. This approach ensures that each adjustment aligns with the intended aggregation and avoids introducing new issues.

The data platform has the capability to send feedback to the LLM in real-time, allowing the LLM to adjust the SQL query dynamically based on ongoing validation checks, including those specifically aimed at preventing double counting.

The feedback loop allows the data platform to continuously interact with the LLM, guiding it through incremental adjustments to the SQL query. This process can be effective for queries with complex joins, aggregations, or conditions that may need multiple refinements to align perfectly with the data schema and relationships.

Each time the platform identifies a potential issue, such as a risk of double counting or a misaligned aggregation, the data platform sends feedback to the LLM. The LLM then modifies the query to address that issue, incorporating the feedback to produce a revised SQL statement.

The data platform can send feedback in a structured format, outlining specific guidance based on detected issues. Types of feedback can include join condition corrections where if a join condition is identified as potentially causing double counting (e.g., a many-to-one relationship misaligned with an aggregation), the platform provides the LLM with guidance to adjust the join clause. The data platform can send aggregation modifications where for double counting prevention, the data platform may recommend the LLM apply DISTINCT within aggregation functions (e.g., COUNT(DISTINCT column_name)) or aggregate data in subqueries before joining with other tables.

The data platform can send grouping adjustments where if incorrect grouping levels are detected, the feedback directs the LLM to adjust the GROUP BY clause to the appropriate granularity. The data platform can send query restructuring feedback where for more complex cases, the data platform may instruct the LLM to use nested subqueries or common table expressions (CTEs) to achieve proper aggregation within the fact table before joining with dimension tables.

As each feedback message is processed, the LLM makes incremental adjustments to the SQL query and re-submits it for validation. This allows for a continuous refinement process, with each iteration honing the query's accuracy. With each adjustment, the platform re-runs validation checks, feeding new observations back to the LLM if further refinements are necessary. For example, if the initial feedback led to corrected join conditions but still showed minor grouping issues, a new feedback cycle would target those specific grouping concerns.

Each iteration involves dynamic validation checks that identify any remaining or new issues resulting from the latest query adjustment. This process helps ensure that each change made by the LLM doesn't inadvertently introduce new errors. The platform uses specific validation rules that automatically trigger different types of feedback. For instance if double counting is detected, the data platform prompts the LLM to modify aggregations to remove duplicate counts. If grouping discrepancies are found, feedback is sent to correct the GROUP BY clause to reflect proper granularity based on the relationship between fact and dimension tables. If join ambiguities arise, the data platform advises the LLM to qualify join keys explicitly, ensuring each join uniquely matches the appropriate data records.

The data platform ensures that any updates to the query do not alter the fundamental intent of the user's original natural language request. For example, if the user asked for total sales by region, the updates focus only on structuring the SQL to avoid double counting without altering the aggregation or grouping intent.

After updating, the platform may perform a final check to verify that the query remains semantically aligned with the request and that all adjustments effectively prevent double counting without introducing inaccuracies.

As such, the data platform generates an updated SQL query that is structured to prevent double counting, accurately representing the relationships and aggregations according to the data's hierarchy. This updated query is now ready for execution on the database, confident in its accuracy and alignment with the user's intent.

In some cases, the LLM may generate intermediary SQL query code as part of a multi-step approach to creating the final SQL query. This intermediary code acts as a structured outline or pseudo SQL, serving as a scaffold that captures the main query components without finalizing every SQL-specific detail.

This intermediary format can help another LLM or a dedicated module refine the query further to generate the final SQL query code, ensuring accuracy and alignment with complex requirements like data relationships, aggregations, and joins.

In some cases, the intermediary code breaks down the main components (e.g., tables, fields, join types) of the query without locking in precise SQL syntax. This step helps clarify the query logic and flow before producing a final, executable SQL. By creating an intermediary structure, the LLM enables another module or LLM to take over specific tasks, such as adding precise syntax, optimizing joins, or validating aggregation logic, which is particularly useful in complex queries.

Thus, it is appreciated that the validation of the LLM-generated SQL code can be on the intermediary code and/or the final SQL query code. It is also appreciated that one module (such as one LLM) or a plurality of modules may be implemented to generate the final executable SQL query code.

In some cases, the data platform can enable real-time validation and feedback while the LLM is generating SQL code, enabling a dynamic, interactive process where validation occurs on-the-fly with each word or phrase generated. By validating progressively, the data platform allows the LLM to adjust the SQL query even before the full response is completed, creating a more efficient, accurate, and responsive query generation process.

As the LLM generates text—word by word or phrase by phrase—the data platform parses each segment in real-time. The data platform immediately identifies potential SQL components, such as SELECT clauses, table names, and join conditions, recognizing these elements without needing the complete SQL statement.

For each new data source or operation detected (e.g., a table or a join function), the platform dynamically adds nodes and edges to the undirected graph. This incremental graph construction means that each component of the SQL query, as it is generated, is integrated into the graph, establishing relationships early on.

As each part of the SQL query is parsed and nodes/edges are added to the undirected graph, the data platform incrementally converts these edges into a directed graph by identifying relationships. For example, if the LLM generates a phrase indicating a JOIN on a foreign key, the platform can immediately classify the relationship as many-to-one or one-to-many.

With each new join or relationship generated, the platform updates the graph's directionality to reflect the proper relationship type. This early transformation allows the platform to detect potential aggregation or relationship issues before the query structure is fully realized.

Since the platform continually builds and refines the directed graph, the data platform can immediately detect potential issues—such as double counting risks or misaligned joins—as soon as they appear. For example, if the LLM introduces a one-to-many join with double counting, the platform flags this discrepancy in real time by generating text of such double counting and feed this back to the LLM. The LLM can then use this information to update the SQL query code.

With each operation (like SUM or COUNT), the data platform validates the SQL code. If an aggregation seems likely to cause double counting based on existing edges, the platform can alert the LLM to adjust grouping or change the aggregation method.

If a validation issue is detected, the data platform can send an error flag back to the LLM with details on the problem. This feedback could include instructions to correct the aggregation, adjust join conditions, or change grouping levels, depending on the issue.

Based on the platform's feedback, the LLM can adjust its generated query in real-time. If the feedback indicates a misalignment in join relationships, the LLM may immediately alter its response to replace JOIN with LEFT JOIN or change the aggregation strategy. The LLM adapts its generation strategy based on the platform's feedback. If, for instance, the LLM is alerted to a double counting risk in an early SUM operation, the LLM may proceed by grouping appropriately in the following steps, reducing the risk of error accumulation.

In some cases, the data platform generates granularity graphs composed of nodes and edges. The granularity graph can be designed to model granularities within the database schema and these granularities are represented through nodes and edges. The granularity graph becomes a powerful abstraction for analyzing and validating SQL queries, particularly for addressing aggregation and relationship issues like double counting.

A granularity graph can be represented by the unique levels of granularity across tables and relationships within a database schema. Nodes can represent granularities or "levels of detail" in the data. These granularities can correspond to individual tables, subsets of columns, or even CTEs that group data at specific levels.

Edges can represent relationships or joins between these granularities. The edges can be directed to indicate the direction of data aggregation or projection, such as many-to-one (a finer granularity flowing into a coarser granularity) or one-to-one (a direct correspondence between granularities).

Each node in the granularity graph can represent a unique granularity in the schema. A granularity can include the level of aggregation or detail present in a table, CTE, or SQL subquery. For example, a sales table may represent a fine granularity where each row corresponds to a specific transaction. A customers table may represent a coarser granularity where each row corresponds to a unique customer. A node in the graph for sales can represent the granularity of individual transactions, while a node for customers represents the aggregation level of customer data.

In more complex cases, multiple tables that share a one-to-one relationship (e.g., users and user_profiles) can be merged into a single node since their granularity is effectively identical. This simplifies the graph without losing granularity detail.

Directed edges represent joins or data relationships between granularities. The directionality of the edges specifies how data flows between different levels of granularity.

- Many-to-One (Aggregation): A sales table joined to a customers table would result in a directed edge pointing from sales (finer granularity) to customers (coarser granularity).
- One-to-One (Direct Mapping): If two tables (e.g., users and user_profiles) share a one-to-one relationship, the edge between them would not alter the granularity.
- Many-to-Many: Complex relationships, such as between orders and products in a transactional database, are represented as bidirectional edges or through intermediate nodes that account for the relationship's complexity.

The edge annotations capture join types (e.g., inner join, left join), keys used for the joins, and whether the join preserves or alters the granularity of the connected nodes.

The granularity graph is dynamically constructed as the SQL query is parsed. Each part of the query (e.g., tables, joins, aggregations) corresponds to specific graph elements:

- SELECT Clause: Determines which granularity is being queried or aggregated, influencing the starting nodes.
- JOIN Clause: Adds edges between nodes based on the tables and relationships specified.
- GROUP BY Clause: Highlights the granularity at which the final query operates, helping determine the graph's terminal nodes.

By analyzing the direction of data flow and relationships between granularities, the graph helps identify where aggregation could result in duplicate counting of data. CTEs and subqueries can be treated as nodes, with their internal structure incorporated into the graph to ensure consistency in relationships and aggregation. Queries with multiple joins, nested aggregations, or branching relationships can be represented systematically, allowing for precise validation and correction.

In some cases, the data platform introduces a context model that dynamically interacts with the SQL query generation and validation process. The context model adds a layer of statefulness and adaptability to represent and refine the relationships and metadata associated with the underlying data schema and ongoing query processing. This allows the platform to maintain an evolving "knowledge state" that influences how directed graphs are built and updated as the query progresses.

The context model can include a persistent data structure or framework that encapsulates schema metadata that includes details about tables, columns, relationships (e.g., primary and foreign keys), and constraints in the database, historical query information that stores details from previously processed queries, such as validated joins, groupings, or common aggregation patterns, dynamic updates during query processing that tracks real-time updates as the SQL query is generated, incorporating inferred relationships, granularities, and error corrections identified by the platform, and derived context from CTEs or subqueries that represent intermediate results or dependencies created during the query generation process (e.g., relationships between CTEs or derived tables).

This context model may not be static, but instead, evolves as the LLM generates the SQL query, serving as a stateful memory that informs graph construction and validation.

Before query processing begins, the context model is initialized using database schema metadata where the model fetches information about the database schema, including table structures, relationships, and constraints (e.g., one-to-many relationships), preloaded patterns or rules where the model can include predefined patterns or best practices, such as common join conditions or aggregation rules for certain tables, and/or historical context where if the platform has previously validated queries for the same user or dataset, this historical data is loaded into the context model for reuse. For example, if a previous query already established that sales is joined with customers on customer_id, the context model can reuse this relationship for subsequent queries without recalculating or revalidating it.

As the SQL query is generated incrementally by the LLM, the platform uses the context model to dynamically guide and refine the directed graph creation process. As the LLM generates components of the query (e.g., a SELECT clause, a JOIN, or an aggregation function), the platform parses these components in real time. The context model updates its representation of the query's evolving structure, mapping new tables, columns, and relationships to the corresponding nodes and edges in the directed graph.

If the SQL query includes derived entities such as CTEs or subqueries, the context model infers relationships that are not explicitly defined in the schema. For example, a CTE may summarize sales data by region, creating a new granularity. The context model updates itself to include this intermediate granularity as a node. If the LLM generates a join involving the CTE, the context model updates the directed graph with edges connecting the CTE's granularity to related tables.

The platform continuously validates each newly generated query component against the context model, ensuring that the model aligns with known relationships and constraints. For example, If the context model identifies a many-to-one relationship between sales and customers, the data platform ensures that aggregations involving sales are grouped correctly by customer_id to prevent double counting. Any errors detected (e.g., misaligned joins or invalid aggregations) are flagged, and the context model provides feedback to the LLM to adjust the query.

The context model evolves dynamically based on both the query structure and corrections applied during validation. For example, if the LLM attempts a many-to-many join that violates schema constraints, the context model may adjust the directed graph by splitting the operation into intermediate steps (e.g., introducing a new CTE to resolve the many-to-many relationship). The context model tracks these changes, updating its understanding of how derived entities and relationships interact.

The context model can integrate granularity information to refine its representation of relationships and aggregations. As each query component is processed, the context model tracks the granularity of the data at each stage (e.g., transaction-level for sales, customer-level for customers, regional-level for regions). For derived entities such as CTEs, the context model infers the resulting granularity based on operations performed (e.g., GROUP BY or aggregation). This granularity information is directly reflected in the directed graph, ensuring that edges are annotated with the correct relationships (e.g., many-to-one or one-to-many).

As the query progresses, the directed graph is continuously updated to reflect the evolving context. Each node in the graph corresponds to a table, CTE, or derived entity, with annotations derived from the context model (e.g., granularity, schema constraints).

Edges between nodes are updated based on inferred or validated relationships in the context model, ensuring that joins, aggregations, and groupings align with both schema metadata and real-time query updates. The context model acts as the central authority for validation, guiding the directed graph's evolution and providing immediate feedback to the LLM for query adjustments.

Various figures herein are described as being performed by certain systems or applying certain processes, such as a particular machine learning model or large language models, but the processes described herein can be performed by one or more other or the same machine learning models or large language models.

Figure 4:
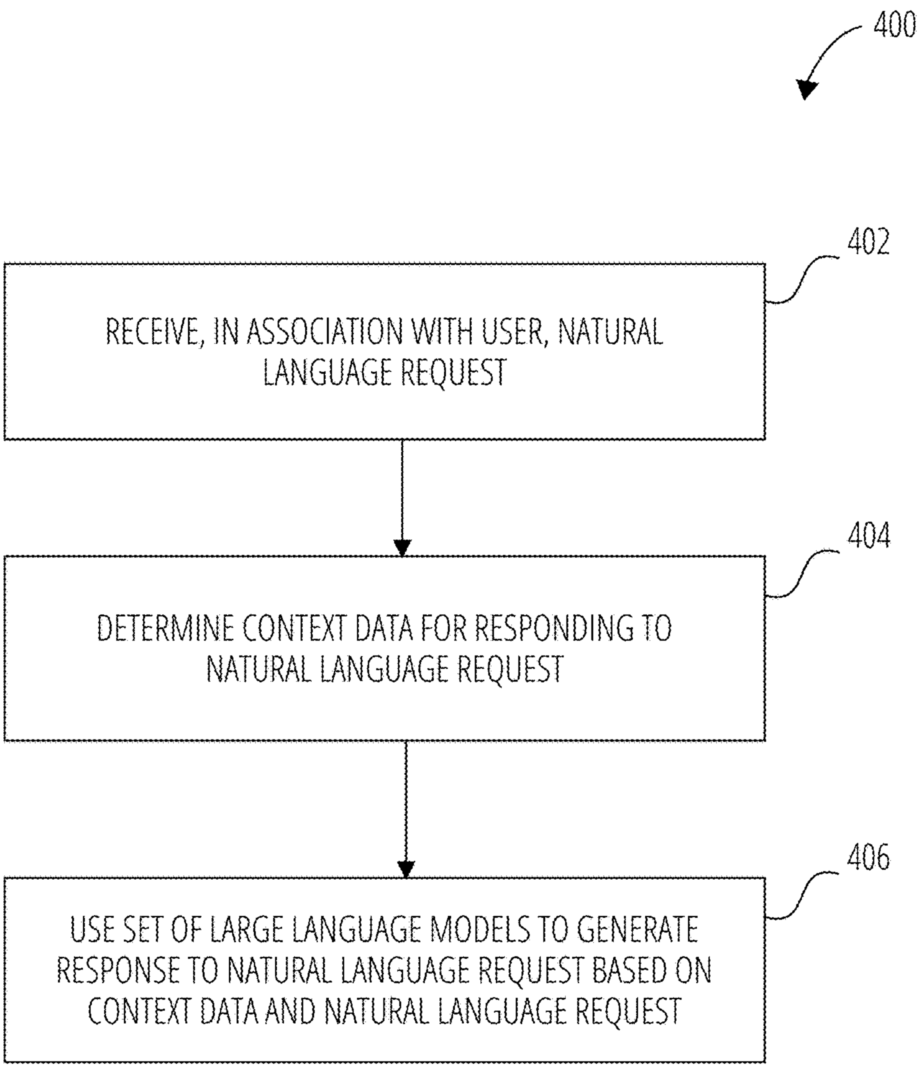
FIG. 4 and FIG. 5 are flowcharts of example methods for generating a structured language data query based on a natural language question and context data relating to a schema of a data store, according to some examples.
Figure 5:
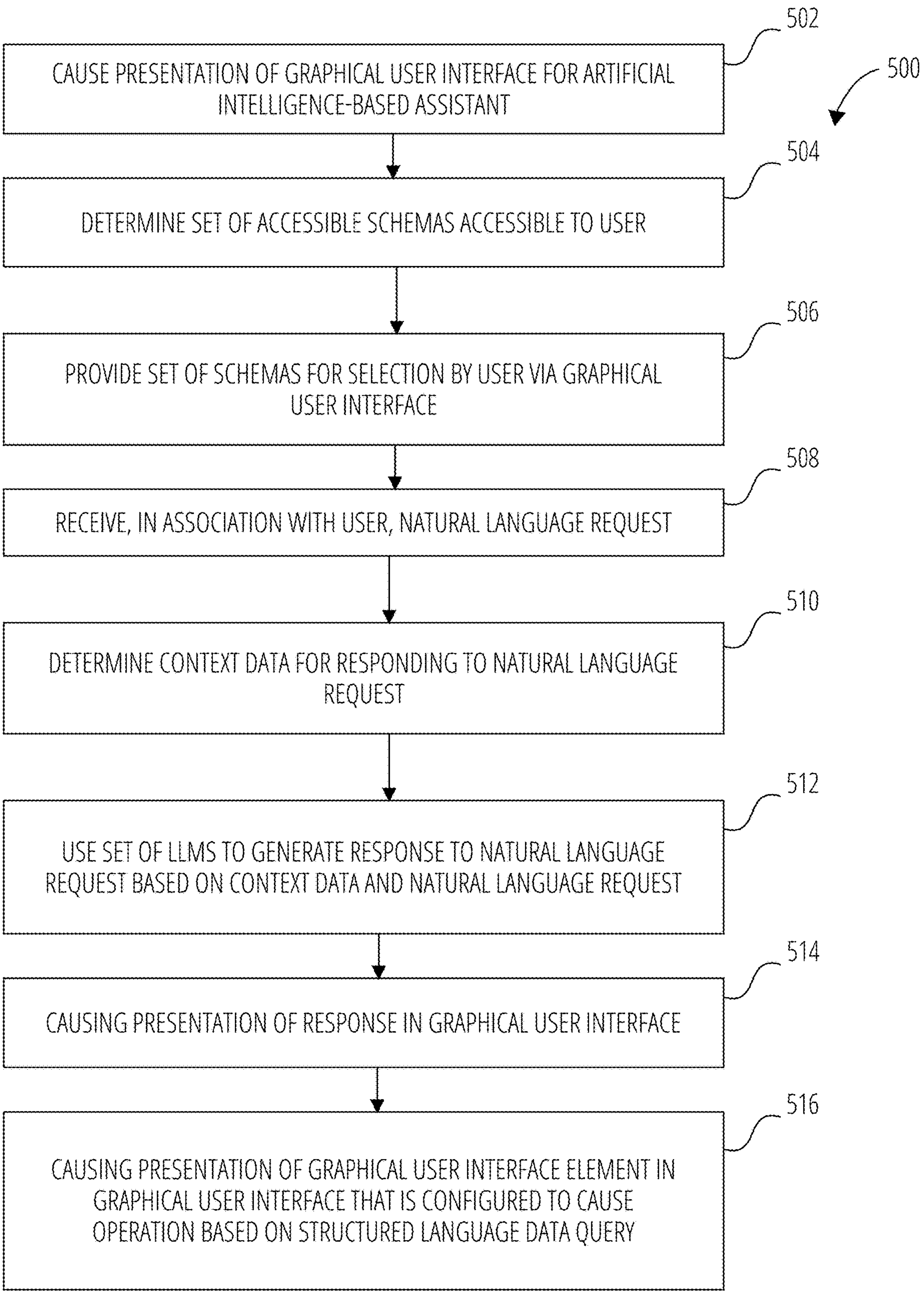

FIG. 4 and FIG. 5 are flowcharts of example methods 400, 500 for generating a structured language data query based on a natural language question and context data relating to a schema of a data store, according to some embodiments of the present disclosure. Any of methods 400, 500 may be embodied in computer-readable instructions for execution by one or more hardware components (e.g., one or more processors) such that the operations of any of methods 400, 500 can be performed by components of the structured language data query generator or the network-based database system, such as a network node (e.g., the structured language data query generator executing on a network node of the compute service manager) or a computing device (e.g., client device), one or both of which may be implemented as a machine performing the disclosed functions. Accordingly, methods 400, 500 are described below, by way of example with reference thereto. However, it shall be appreciated that any of methods 400, 500 may be deployed on various other hardware configurations and is not intended to be limited to deployment within the network-based database system.

At operation 402, a hardware processor (e.g., implementing the structured language data query generator) receives, in association with a user, a natural language request. Additionally, at operation 402, the hardware processor can receive, in association with the user, a selection of a schema. Depending on the embodiment, the selection of the schema can be performed by a user (e.g., a user entering the selection via a graphical user interface for an artificial intelligence-based assistant) or, alternatively, can be automatically performed by a process that selects the schema based on the natural language request (e.g., based on the natural language request). Where the schema is automatically selected based on the natural language request, a user would not need to perform or otherwise provide a selection of the schema.

During operation 404, the hardware processor (e.g., implementing the structured language data query generator) determines (e.g., generates or identifies) context data for responding to the natural language request. For some embodiments, the context data comprises metadata associated with the schema (specified by the selection). Additionally, for some embodiments, the context data comprises a set of text from chat history data associated with the user (e.g., the last 15 messages from user's chat with the AI-based assistant). According to some embodiments, operation 404 comprises performing a search (e.g., using a search component), on a metadata data store, for the metadata associated with the schema, where the search can be performed using a query string, and receiving a result to the search, where the result comprises the metadata. The query string can comprise one or more of: the natural language request; a set of text from the chat history data (e.g., a concatenated list of chat text or past messages); information from the schema; or information regarding the user (e.g., user's username, role, organization, privileges, access, etc.). The search can be facilitated by a search component, such as a catalog search service, which can provide relevant table names and relevant columns based on a query string. The search component can enable an embodiment to operate in databases and schemas with large numbers of tables, which would otherwise be challenging to operate in given the finite size of the context window in the underlying one or more LLMs. The search component can be accessed, for example, by way of an application programming interface (API) (e.g., which can receive a query string which can receive a query string, identification of the schema as search scope, at least some portion of chat history, or some combination thereof). The search component can search both stored metadata (e.g., on a metadata data store) and one or more stored documents (e.g., documentation for a data system).

Depending on the embodiment, the metadata can comprise information (e.g., name, description of structure, data types, entity relationships, etc.) regarding at least one of: a data store; one or more tables on the data store and relevant to the query string; one or more columns on the data store and relevant to the query string; or one or more views on the data store and relevant to the query string. Metadata can comprise a comment (e.g., user comment), which can be associated with at least one data store, table, view or column identified as being relevant to the query string. A user comment can comprise an annotation added to an object on a data platform, which can include a user object, a role object, a data warehouse object, a database object, a table object, or a column object. Metadata can comprise a tag, which can be associated with at least one data store, table, view or column identified as being relevant to the query string. A tag can be associated with an object on a data platform and permit a user to monitor sensitive data for compliance, discovery, protection, or resource usage use cases (e.g., through either a centralized or decentralized data governance management approach).

For some embodiments, the context data comprises a set of sample values for one or more columns described by the schema or for one or more columns of one or more elements described by the schema, such one or more tables or one or more views identified in the metadata provided by the search operation. The sample values of columns can comprise performing a SHOW SQL query to fetch all tables or views in the schema accessible to the user, performing a SQL query to fetch the sample values from the fetched tables or views, and filtering down the results to the relevant tables and columns identified in the metadata provided by the search operation.

For some embodiments, the context data comprises a structured language data query history associated with the user. In this way, the user's historical queries can be used as a predictor for structured language data queries that the user will want to write in the future. Additionally, for some embodiments, the context data comprises user feedback data associated with the user. The user feedback data can comprise, for example, feedback that the user provides as the user interacts (e.g., converses) with an AI-based assistant, which can include positive or negative feedback indicators the user provides in connection with a prior response generated by the AI-based assistant. Some embodiments identify and extract this user feedback and generate a repository that contains all the feedback the user provides over time.

For some embodiments, the context data comprises information from verified query repository data (e.g., stored on a verified query repository accessible to the user), where the verified query repository data comprises one or more individual structured language queries paired with natural language descriptions of the individual structured language queries. A user (or the user's organization) can build and maintain a repository of "verified structured language data queries" for the user's (or the organization's use), where each of the verified structured language data queries has a clear natural language description that has been submitted by the user. According to some embodiments, a set of workflows is implemented that permits one or more users (e.g., of an organization) to submit verified structured language data queries to a repository (e.g., associated with the organization). For instance, a user can be able to add a verified structured language data query from a conversation with an AI-based assistant, or directly from a structured language data query history. In the course of adding a verified structured language data query, some embodiments can distill a prior conversation into a natural language request (e.g., natural language question) to pair with a structured language data query or include any relevant feedback that a user had in the course of the conversation as an attachment to the verified structured language data query. The natural language description-structured language data query pairs stored in the repository can encode a variety of information (e.g., organizational knowledge) that can be used as context data for a structured language data query generator as described herein.

For some embodiments, the context data comprises a set of custom instructions or pre-instructions provided by the user. Through the set of custom instructions or pre-instructions, the user can share a set of preferences or specific knowledge (e.g., business knowledge) with the structured language data query generator, which the structured language data query generator can consider (as context) during generation of one or more subsequent responses for the user.

For some embodiments, the context data comprises auto-generated metadata, which can include automatically generated data classification information (e.g., extracted from scans of user data and metadata). The data classification information can comprise a data description of the data content, detailed data format, and variant column schema. Auto-generated metadata can also include data describing a top X number of distinct values for each column of a relevant table or view, which can be used as sample data by the structured language data query generator.

For some embodiments, the context data comprises a set of curated views (e.g., curated by one or more users in an organization). An individual view in the set of curated views can use descriptive and easy-to-understand names for their columns (e.g., the names based on business and data taxonomy likely to be used while using an AI-based assistant), comprise columns having appropriate data type, define commonly used metrics/expressions as new columns, and capture common or complex joins.

For some embodiments, the context data comprises context information provided by a software application external to the AI-based assistant. For example, where the AI-based assistant is invoked and displayed within a software application environment, the software application environment can provide context information (e.g., "product surface" context), such as content (e.g., content data from a data worksheet or data notebook).

For operation 406, the hardware processor (e.g., implementing the structured language data query generator) uses a set of large language models to generate a response to the natural language request based on the context data and the natural language request. For some embodiments, the context data and the natural language request are used as input to the set of large language models to generate the response. For some embodiments, the response comprises a structured language data query for (e.g., SQL query configured for execution on) a data store (e.g., database), and a natural language explanation of the structured language data query. For various embodiments, the set of large language models comprises a chain of large language models (e.g., two or more large language models), where a first large language model of the chain of large language models generates a first output based on a first input (e.g., first prompt) that comprises the natural language request and the context data, and where a second large language model of the chain of large language models generates a second output based on a second input (e.g., second prompt) that comprises the natural language request and the first output from the first large language model. The second large language model can receive at least a portion of the context data, additional context data (e.g., determined specifically for the second large language model), or a combination of both. An individual large language model in the set of large language models can receive, as input, a set of instructions specific to the individual large language model; the set of instructions can instruct the individual large language model to perform its intended function/purpose within the set of large language models.

Referring now to FIG. 5, at operation 502, a hardware processor (e.g., implementing the structured language data query generator) causes presentation of a graphical user interface for an artificial intelligence-based assistant. For some embodiments, the graphical user interface for the artificial intelligence-based assistant is presented within a software application environment (e.g., IDE), where the context data can comprise information regarding a current context of the software application environment (e.g., current data content being displayed in graphical user interface of the software application environment). For some embodiments, the selection of the schema is received from the user by the graphical user interface, and the natural language request is received from the user by the graphical user interface.

At operation 504, the hardware processor (e.g., implementing the structured language data query generator) determines a set of accessible schemas accessible to the user. For operation 506, the hardware processor (e.g., implementing the structured language data query generator) provides the set of accessible schemas for selection by the user via the graphical user interface, where the selection of the schema (e.g., via the graphical user interface) is selected from the set of accessible schemas.

After operation 506, operations 508 through 512 are performed. For some embodiments, operations 508, 510, 512 are respectively similar to operations 402, 404, 406 of method 400 described and illustrated with respect to FIG. 4.

At operation 514, the hardware processor (e.g., implementing the structured language data query generator) causes presentation of the response in the graphical user interface of the AI-based assistant and, at operation 516, the hardware processor (e.g., implementing the structured language data query generator) causes presentation of a graphical user interface element (e.g., graphical user interface button) in the graphical user interface of the AI-based assistant. For some embodiments, the graphical user interface element is configured to cause, upon selection of the graphical user interface element by the user: execution of the structured language data query on the data store; and display of a query result in the graphical user interface, where the query result is received in response to the execution of the structured language data query.

For various embodiments, the graphical user interface for the artificial intelligence-based assistant is presented as a first graphical user interface within a software application environment. A graphical user interface element (presented in the first graphical user interface) can be configured to cause, upon selection of the graphical user interface element by the user, insertion of the structured language data query from the response to a second graphical user interface of the software application environment, where the second graphical user interface is external to the first graphical user interface of the artificial intelligence-based assistant. Additionally or alternatively, a graphical user interface element (presented in the first graphical user interface) can be configured to cause, upon selection of the graphical user interface element by the user: execution of the structured language data query on the data store; and display of a query result in a second graphical user interface of the software application environment, where the second graphical user interface is external to the first graphical user interface of the artificial intelligence-based assistant, and where the query result is received in response to the execution of the structured language data query.

Figure 6:
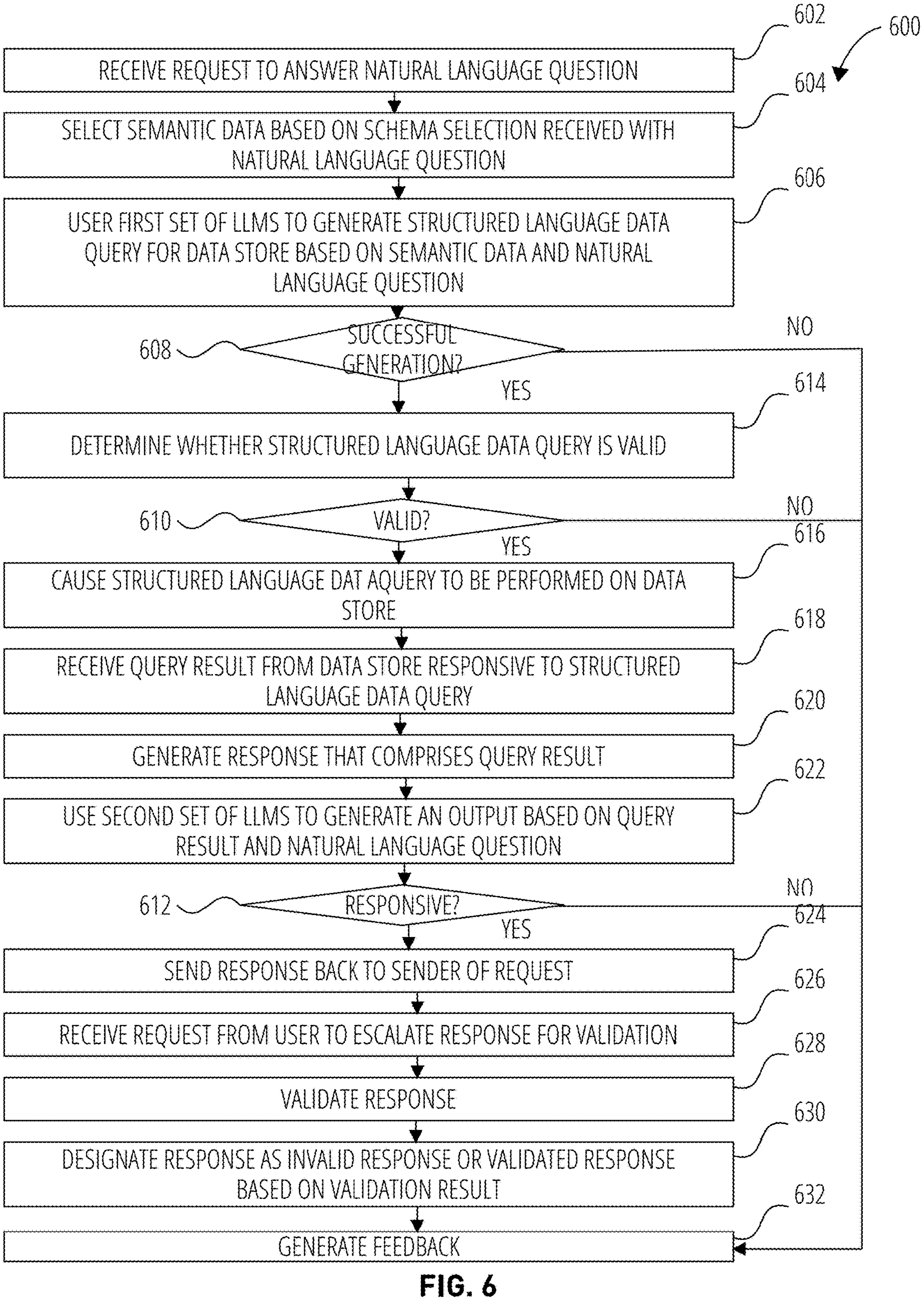
FIG. 6 is a flowchart of an example method generating a structured language data query based on a natural language question and semantic data associated with a schema of a data store, according to some examples.

FIG. 6 is a flowchart of an example method 600 generating a structured language data query based on a natural language question and semantic data associated with a schema of a data store, according to some embodiments of the present disclosure. Method 600 may be embodied in computer-readable instructions for execution by one or more hardware components (e.g., one or more processors) such that the operations of methods herein can be performed by components of the structured language data query generator or the network-based database system, such as a network node (e.g., the structured language data query generator executing on a network node of the compute service manager) or a computing device (e.g., client device), one or both of which may be implemented as a machine performing the disclosed functions. Accordingly, method 600 is described below, by way of example with reference thereto. However, it shall be appreciated that method 600 may be deployed on various other hardware configurations and is not intended to be limited to deployment within the network-based database system.

At operation 602, a hardware processor (e.g., implementing the structured language data query generator) receives a request to answer a natural language question generated by a user. For some embodiments, the first user input is received via a graphical user interface (e.g., chat interface), where the hardware processor (e.g., of the structured language data query generator) causes the graphical user interface to be displayed on a client device (e.g., client device).

In response to the request received by operation 602, during operation 604, the hardware processor (e.g., implementing the structured language data query generator) selects semantic data based on a schema selection received with the natural language question (e.g., in the request, such as part of an API request). Alternatively, a database table or database view selection can be received with the natural language question (e.g., in the request and in place of a schema selection), a schema associated with the database table or the database view can be determined (e.g., identified), and the semantic data can be selected based on the determined (e.g., identified) schema. For some embodiments, semantic data is auto-selected based on the natural language question (e.g., based on analysis of the natural language question, which can include determining or identifying a database table or database view in responding to the natural language question, and selecting schema data based on the determining/identified database table or database view).

At operation 606, the hardware processor (e.g., implementing the structured language data query generator) uses a first set of large language models to generate a structured language data query for a data store based on semantic data and the natural language question. For some embodiments, the semantic data comprises a semantic description of at least a portion of a schema of the data store. For some embodiments, operation 606 comprises using the first set of large language models to generate the structured language data query and an explanation of the structured language data query based on semantic data and the natural language question, where the response comprises at least a portion of the explanation. For some embodiments, operation 606 comprises using a first large language model of the set of large language models to generate a first output based on the semantic data and the natural language question, where the first output indicates a category for the natural language question. In response to the category indicating that the natural language question is answerable using the schema and the data store, during operation 606, a second large language model can be used to generate a second output based on the semantic data and the natural language question, where the second output comprises the structured language data query. In particular, a second large language model can be used to generate the second output based on the semantic data, the natural language question, and metadata for the data store (e.g., table data definition language (DDL)). Alternatively, in response to the category indicating that the natural language question is not answerable using the schema and the data store, during operation 606, a response can be generated to comprise feedback and the response can be sent back to the sender, where the feedback can be provided in the first output generated by the first large language model. The feedback can comprise, for example, one or more suggestions (e.g., suggested questions) that the user can use in place of the natural language question.

At decision point 608, method 600 proceeds to operation 610 in response to the set of large language models successfully generating the structured language data query, otherwise method 600 proceeds to operation 632.

During operation 610, the hardware processor (e.g., implementing the structured language data query generator) determines whether the structured language data query is valid. At decision point 612, method 600 proceeds to operation 614 in response to determining that the structured language data query is valid, otherwise method 600 proceeds to operation 632.

At operation 614, the hardware processor (e.g., implementing the structured language data query generator) causes the structured language data query to be performed on the data store, at operation 616, the hardware processor receives a query result (e.g., numerical or tabular data) from the data store responsive to the structured language data query, and at operation 618, the hardware processor generates a response that comprises the query result and that is responsive to request. Thereafter, at operation 620, the hardware processor (e.g., implementing the structured language data query generator) uses a second set of large language models to generate an output based on the query result and the natural language question, where the output indicates whether the query result is responsive to the natural language question. In particular, a second set of large language models can be used to generate an output based on the natural language question, the structured language data query, and an explanation of the structured language data query. In this way, operation 620 can perform a sanity check on the query result. At decision point 622, method 600 proceeds to operation 624 in response to the query result being responsive to the natural language question, otherwise method 600 proceeds to operation 632. During decision point 622, the hardware processor (e.g., implementing the structured language data query generator) sends the response back to a sender of the request. Where the request is received at operation 602 as input to an application program interface (API), and the sending of the response back to a sender of the request can comprise returning the response as output of the API.

Subsequently, at operation 626, the hardware processor (e.g., implementing the structured language data query generator) receives a request from the user to escalate the response for validation. In response to the request, at operation 628, the hardware processor (e.g., implementing the structured language data query generator) validates the response, and at operation 630, the hardware processor designates the response as an invalid response or a validated response based on a validation result. For instance, a request received from the user can be to escalate the response to a second user for validation, the response can be escalated to the second user for validation, and after the validation by the second user, the response can be designated as a validated response or an invalid response based on a validation result from the validation. In another example, prior to sending the response to the sender, the response can be compared against one or more prior responses to validate the response and, in response to determining that the response is valid, designating the response as a validated response.

During operation 632, the hardware processor (e.g., implementing the structured language data query generator) generates feedback that is sent back to the sender, where the feedback can indicate what caused operation 632 to be performed. For example, the feedback can indicate if a structured language data query (e.g., SQL query) is not successfully generated, if the structured language data query generated is not valid, or if a response generated based on a query result is not responsive to the natural language question.

Figure 7:
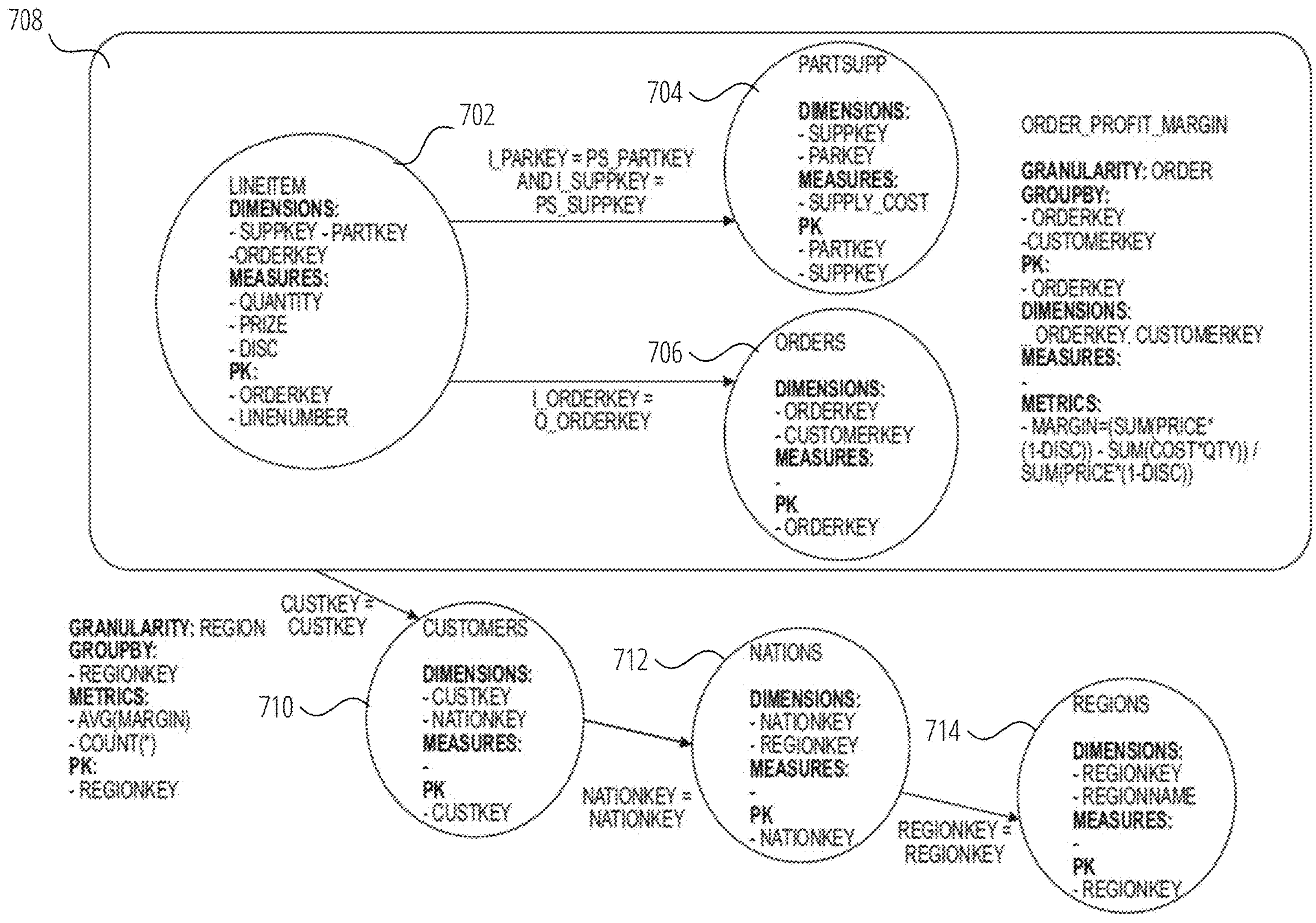
FIG. 7 is a directed graph illustrating merging of nodes, according to some examples.

FIG. 7 is a directed graph illustrating merging of nodes, according to some examples. Once the directed graph is generated, with each edge annotated to reflect the relationships between nodes from undirected graph (e.g., one-to-one, one-to-many, many-to-one, many-to-many) to directed graph (e.g., one-to-many only relationships), the data platform can simplify the graph by merging certain nodes (e.g., nodes that are connected via a one-to-one relationship).

Merging these nodes helps to streamline the validation process by reducing the number of nodes and edges, focusing the validation checks on relationships where double counting might occur, such as many-to-one or many-to-many relationships.

By merging nodes connected through certain relationships (e.g., one-to-one relationships), the data platform can reduce the complexity of the graph without impacting the accuracy of subsequent validation. Since one-to-one relationships don't introduce any risk of double counting, merging these nodes doesn't affect data aggregation or grouping.

With fewer nodes, the platform can focus its validation on more complex relationships (such as one-to-many) where double counting risks are higher. This reduction in complexity leads to faster and more efficient validation processes.

The directed graph generated includes annotations on each edge indicating the type of relationship, such as one-to-one, one-to-many, or many-to-one. These annotations are based on database schema definitions (e.g., primary keys, foreign keys, unique constraints).

A one-to-one relationship indicates that each record in one table corresponds uniquely to one record in another table. This could occur, for example, between a users table and a user_profiles table if each user has exactly one profile, and each profile is linked to exactly one user. Nodes connected by a one-to-one edge can be merged because there's no risk of duplicate or missing data; each record on both sides of the relationship maps uniquely to a single record on the other side.

In some cases, since there's no risk of double counting in one-to-one relationships, merging the nodes doesn't impact aggregations. The merged node can represent the combined attributes of both original tables, as aggregations over this combined structure will yield accurate results. Merging nodes connected by a one-to-one edge won't affect other edges, as the unique mapping preserves the data integrity across the graph.

When a one-to-one edge is identified, the data platform merges the two connected nodes into a single, consolidated node. This node now represents both data sources. In FIG. 7, nodes 702, 704, and 706 are merged into a single node 708 due to the one-to-one relationship between the nodes. The remaining relationships remain (e.g., such as with nodes 710, 712, and 714).

The attributes (fields or columns) from both nodes are combined into the consolidated node, with appropriate labels to distinguish which table each attribute originally belonged to if needed. For instance, fields from users and user_profiles are aggregated into a single node with all user-related data.

Any edges connected to either of the original nodes are redirected to the merged node. This can include updating join paths such as if other nodes are connected to either original node, those edges now connect to the merged node, preserving the overall graph structure or maintaining directional integrity where the direction and type (one-to-many, many-to-one) of other edges are maintained to ensure downstream validation accurately reflects the relationships.

Figure 8:
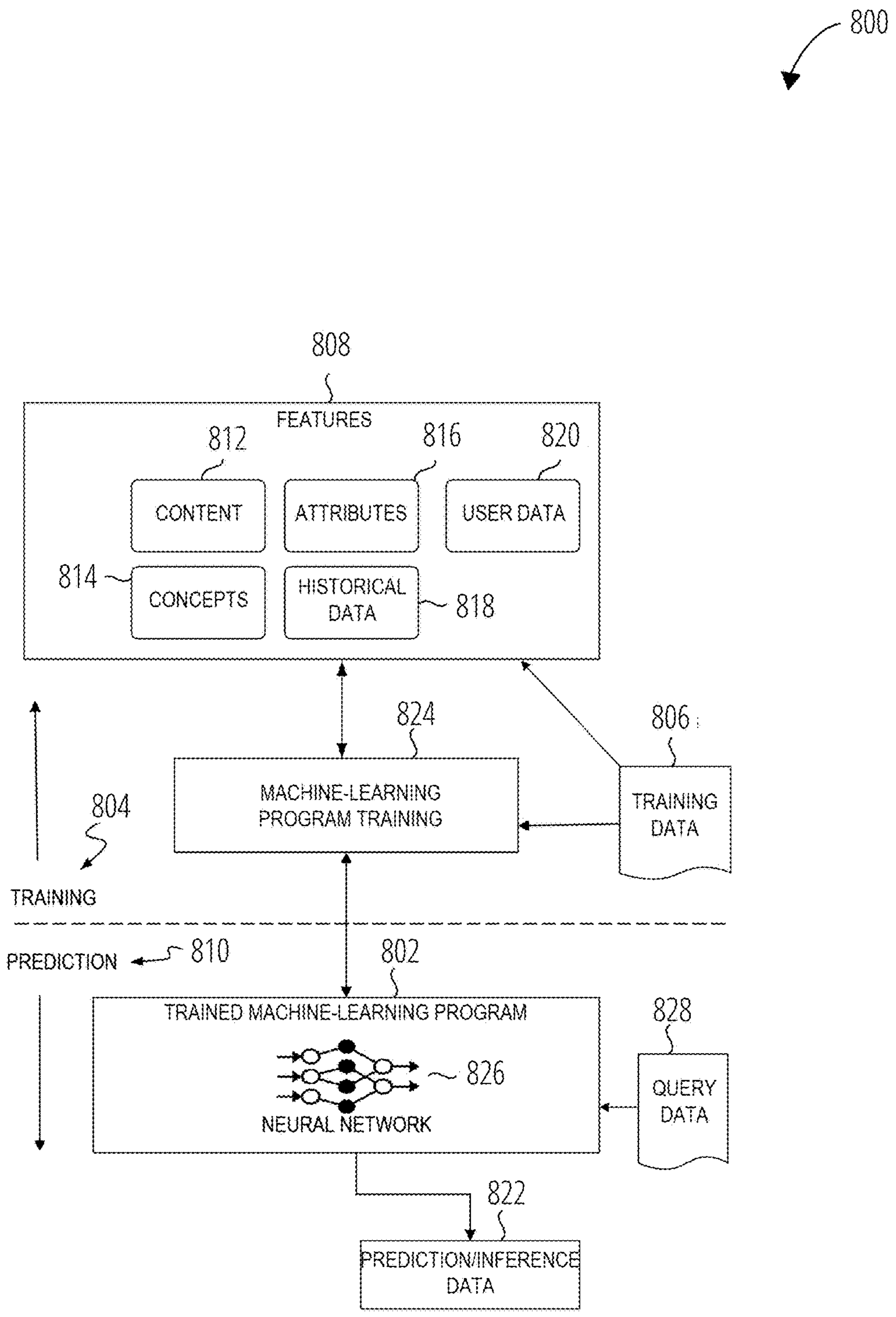
FIG. 8 illustrates training and use of a machine-learning program, according to some examples.

FIG. 8 illustrates further details of two example phases, namely a training phase 804 (e.g., part of the model selection and training 906) and a prediction phase 810 (part of prediction 910). Prior to the training phase 804, feature engineering 904 is used to identify features 808. This may include identifying informative, discriminating, and independent features for effectively operating the trained machine-learning program 802 in pattern recognition, classification, and regression. In some examples, the training data 806 includes labeled data, known for pre-identified features 808 and one or more outcomes. Each of the features 808 may be a variable or attribute, such as an individual measurable property of a process, article, system, or phenomenon represented by a data set (e.g., the training data 806). Features 808 may also be of different types, such as numeric features, strings, and graphs, and may include one or more of content 812, concepts 814, attributes 816, historical data 818, and/or user data 820, merely for example.

In training phase 804, the machine-learning pipeline 800 uses the training data 806 to find correlations among the features 808 that affect a predicted outcome or prediction/inference data 822.

With the training data 806 and the identified features 808, the trained machine-learning program 802 is trained during the training phase 804 during machine-learning program training 824. The machine-learning program training 824 appraises values of the features 808 as they correlate to the training data 806. The result of the training is the trained machine-learning program 802 (e.g., a trained or learned model).

Further, the training phase 804 may involve machine learning, in which the training data 806 is structured (e.g., labeled during preprocessing operations). The trained machine-learning program 802 implements a neural network 826 capable of performing, for example, classification and clustering operations. In other examples, the training phase 804 may involve deep learning, in which the training data 806 is unstructured, and the trained machine-learning program 802 implements a deep neural network 826 that can perform both feature extraction and classification/clustering operations.

In some examples, a neural network 826 may be generated during the training phase 804 and implemented within the trained machine-learning program 802. The neural network 826 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 826 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 826 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 804, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 810, the trained machine-learning program 802 uses the features 808 for analyzing query data 828 to generate inferences, outcomes, or predictions, as examples of a prediction/inference data 822. For example, during prediction phase 810, the trained machine-learning program 802 generates an output. Query data 828 is provided as an input to the trained machine-learning program 802, and the trained machine-learning program 802 generates the prediction/inference data 822 as output, responsive to receipt of the query data 828.

In some examples, the trained machine-learning program 802 may be a generative AI model. Generative AI is a term that may refer to any type of artificial intelligence that can create new content from training data 806. For example, generative AI can produce text, images, video, audio, code, or synthetic data similar to the original data but not identical.

Some of the techniques that may be used in generative AI are: Convolutional Neural Networks, Recurrent Neural Networks, generative adversarial networks, variational autoencoders, transformer models, and the like.

For example, Convolutional Neural Networks (CNNs) can be used for image recognition and computer vision tasks. CNNs may, for example, be designed to extract features from images by using filters or kernels that scan the input image and highlight important patterns. Recurrent Neural Networks (RNNs) can be used for processing sequential data, such as speech, text, and time series data, for example. RNNs employ feedback loops that allow them to capture temporal dependencies and remember past inputs. Generative adversarial networks (GANs) can include two neural networks: a generator and a discriminator. The generator network attempts to create realistic content that can "fool" the discriminator network, while the discriminator network attempts to distinguish between real and fake content. The generator and discriminator networks compete with each other and improve over time. Variational autoencoders (VAEs) can encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies. Transformer models can use attention mechanisms to learn the relationships between different parts of input data (such as words or pixels) and generate output data based on these relationships. Transformer models can handle sequential data, such as text or speech, as well as non-sequential data, such as images or code. In generative AI examples, the output prediction/inference data 822 can include predictions, translations, summaries, media content, and the like, or some combination thereof.

In some example embodiments, computer-readable files come in several varieties, including unstructured files, semi-structured files, and structured files. These terms may mean different things to different people. Examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data.

As used herein, examples of unstructured files include image files, video files, PDFs, audio files, and the like; examples of semi-structured files include JavaScript Object Notation (JSON) files, eXtensible Markup Language (XML) files, and the like. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a cloud data platform 102 can include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A cloud data platform 102 may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a cloud data platform 102, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

In the present disclosure, physical units of data that are stored in a cloud data platform—and that make up the content of, e.g., database tables in customer accounts (e.g., customer users)—are referred to as micro-partitions. In different implementations, a cloud data platform can store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the cloud data platform, a given file is referred to herein as an "internal file" and may be stored in (or at, or on, etc.) what is referred to herein as an "internal storage location." If stored external to the cloud data platform, a given file is referred to herein as an "external file" and is referred to as being stored in (or at, or on, etc.) what is referred to herein as an "external storage location."

While example embodiments of the present disclosure reference commands in the standardized syntax of the programming language Structured Query Language (SQL), it will be understood by one having ordinary skill in the art that the present disclosure can similarly apply to other programming languages associated with communicating and retrieving data from a database.

Figure 9:
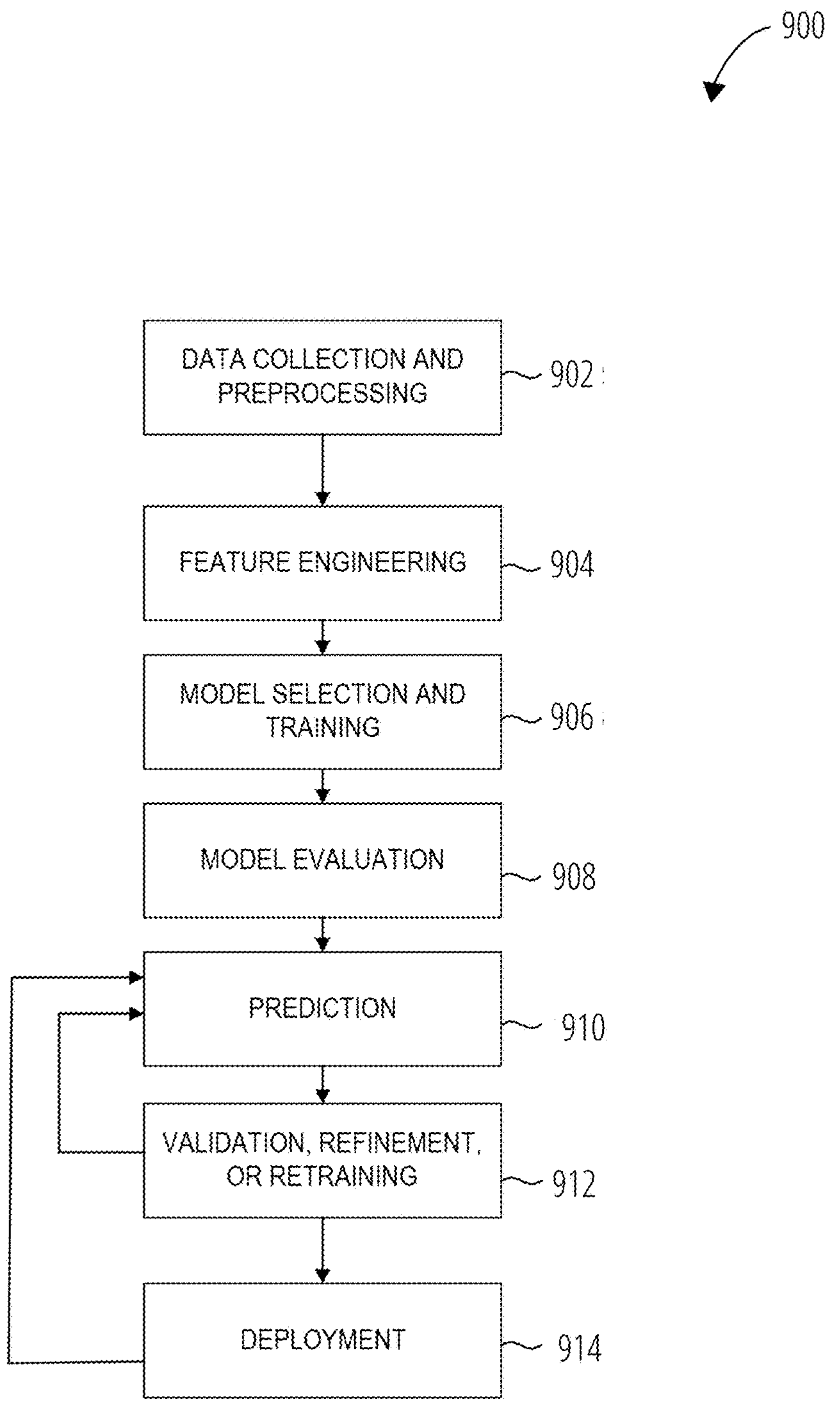
FIG. 9 illustrates a machine-learning pipeline, according to some examples.

FIG. 9 depicts a machine-learning pipeline 900 and FIG. 9 illustrates training and use of a machine-learning program (e.g., model) 800. Specifically, FIG. 9 is a flowchart depicting a machine-learning pipeline 900, according to some examples. The machine-learning pipeline 900 can be used to generate a trained model, for example the trained machine-learning program 802 of FIG. 8, to perform operations associated with searches and query responses.

Broadly, machine learning may involve using computer algorithms to automatically learn patterns and relationships in data, potentially without the need for explicit programming. Machine learning algorithms can be divided into three main categories: supervised learning, unsupervised learning, self-supervised, and reinforcement learning.

For example, supervised learning involves training a model using labeled data to predict an output for new, unseen inputs. Examples of supervised learning algorithms include linear regression, decision trees, and neural networks. Unsupervised learning involves training a model on unlabeled data to find hidden patterns and relationships in the data. Examples of unsupervised learning algorithms include clustering, principal component analysis, and generative models like autoencoders. Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions.

Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (e.g., is this object an apple or an orange?). Regression algorithms aim at quantifying some items (for example, by providing a value that is a real number).

Turning to the training phases 804 as described and depicted in connection with FIG. 9, generating a trained machine-learning program 802 may include multiple phases that form part of the machine-learning pipeline 900, including for example the following phases illustrated in FIG. 9: data collection and preprocessing 902, feature engineering 904, model selection and training 906, model evaluation 908, prediction 910, validation, refinement, or retraining 912, and deployment 914, or a combination thereof.

For example, data collection and preprocessing 902 can include a phase for acquiring and cleaning data to ensure that it is suitable for use in the machine learning model. This phase may also include removing duplicates, handling missing values, and converting data into a suitable format. Feature engineering 904 can include a phase for selecting and transforming the training data 806 to create features that are useful for predicting the target variable. Feature engineering may include (1) receiving features 808 (e.g., as structured or labeled data in supervised learning) and/or (2) identifying features 808 (e.g., unstructured, or unlabeled data for unsupervised learning) in training data 806. Model selection and training 906 can include a phase for selecting an appropriate machine learning algorithm and training it on the preprocessed data. This phase may further involve splitting the data into training and testing sets, using cross-validation to evaluate the model, and tuning hyperparameters to improve performance.

In additional examples, model evaluation 908 can include a phase for evaluating the performance of a trained model (e.g., the trained machine-learning program 802) on a separate testing dataset. This phase can help determine if the model is overfitting or underfitting and determine whether the model is suitable for deployment. Prediction 910 can include a phase for using a trained model (e.g., trained machine-learning program 802) to generate predictions on new, unseen data. Validation, refinement or retraining 912 can include a phase for updating a model based on feedback generated from the prediction phase, such as new data or user feedback. Deployment 914 can include a phase for integrating the trained model (e.g., the trained machine-learning program 802) into a more extensive system or application, such as a web service, mobile app, or IoT device. This phase can involve setting up APIs, building a user interface, and ensuring that the model is scalable and can handle large volumes of data.

In view of the disclosure above, various examples are set forth below. It should be noted that one or more features of an example, taken in isolation or combination, should be considered within the disclosure of this application.

Examples include a system comprising: at least one hardware processor; and at least one memory storing instructions that cause the at least one hardware processor to perform operations comprising: receiving, at a cloud-based server, a natural language query from a user, the natural language query comprising a request that requires access of data in a database; identifying semantic data from the query; generating, by a large language model (LLM) based on the identified semantic data, a SQL query that comprises one or more join functions; parsing the generated SQL query to extract one or more operation types and data sources associated with the query; constructing an undirected graph from the parsed SQL query, the undirected graph comprised of nodes and edges, the nodes representing data sources, the edges representing operations linking the data sources comprising the one or more join functions; converting the undirected graph into a directed graph by adding relationship characteristics to the edges of the undirected graph; validating, based on the directed graph, the SQL query by determining whether the nodes in the directed graph indicate double counting based on the added relationship characteristics; and updating the generated SQL query based on the validation to remove the double counting.

In Example 2, the subject matter of Example 1 includes, wherein the natural language query comprises a plurality of queries, wherein the semantic data is identified based on a latest query of the plurality of queries with the other queries providing context to the latest query.

In Example 3, the subject matter of Examples 1-2 includes, wherein the semantic data comprises specific columns or attributes requested in the natural language query, wherein the LLM generates the SQL query based on the specific columns or attributes requested in the natural language query.

In Example 4, the subject matter of Examples 1-3 includes, wherein the semantic data comprises relationships between data tables requested in the natural language query, wherein the LLM generates the SQL query based on the relationships between the data tables requested in the natural language query.

In Example 5, the subject matter of Examples 1-4 includes, wherein the semantic data comprises operations data to be applied to data requested in the natural language query, wherein the LLM generates the SQL query based on the operations data.

In Example 6, the subject matter of Examples 1-5 includes, wherein parsing the generated SQL query comprises generating tokens representing portions of the SQL query and generating a syntax tree comprised of the generated tokens reflecting the SQL query's logical flow, wherein the undirected graph is constructed using the syntax tree.

In Example 7, the subject matter of Examples 1-6 includes, wherein the undirected graph comprises edges between nodes without a directional flow.

In Example 8, the subject matter of Examples 1-7 includes, wherein converting the undirected graph into the directed graph comprises adding at least one one-to-many relationship in between nodes.

In Example 9, the subject matter of Examples 1-8 includes, wherein converting the undirected graph into the directed graph comprises identifying fact tables and dimension tables, and identifying the relationship such that the fact one of the one-to-many relationship is assigned to the node associated with a fact table, and the many of the one-to-many relationship is assigned to the node associated with the dimension table.

In Example 10, the subject matter of Examples 1-9 includes, wherein updating the SQL query comprises modifying the one or more join functions within the SQL query.

In Example 11, the subject matter of Example 10 includes, wherein the one or more join functions comprise an inner join function, wherein updating the SQL query comprises limiting data on a many side of a one-to-many relationship for the inner join.

In Example 12, the subject matter of Examples 10-11 includes, wherein the one or more join functions comprise an inner join function, wherein updating the SQL query comprises updating one or more primary or foreign keys of the inner join function.

In Example 13, the subject matter of Examples 1-12 includes, wherein updating the SQL query comprises: identifying a fact table side and a dimension side of the one or more join functions; and restricting the one or more join functions to perform aggregations only on the fact table side.

Example 14 is a method performed by at least one hardware processor, the method comprising: receiving, at a cloud-based server, a natural language query from a user, the natural language query comprising a request associated with access of data in a database; identifying semantic data from the query; generating, by a large language model (LLM) based on the identified semantic data, a SQL query that comprises one or more join functions; parsing the generated SQL query to extract one or more operation types and data sources associated with the query; constructing an undirected graph from the parsed SQL query, the undirected graph comprised of nodes and edges, the nodes representing data sources, the edges representing operations linking the data sources comprising the one or more join functions; converting the undirected graph into a directed graph by adding relationship characteristics to the edges of the undirected graph; validating, based on the directed graph, the SQL query by determining whether the nodes in the directed graph indicate double counting based on the added relationship characteristics; and updating the generated SQL query based on the validation to remove the double counting.

In Example 15, the subject matter of Example 14 includes, wherein updating the SQL query comprises sending an indication of the double counting to the LLM causing the LLM to generate the updated SQL query.

In Example 16, the subject matter of Examples 14-15 includes, wherein the operations further comprise: continuously: updating the SQL query via the LLM; and validating the updated SQL query based on an updated directed graph; until determining that the nodes in the directed graph do not indicate double counting.

In Example 17, the subject matter of Examples 14-16 includes, wherein the operations further comprise: identifying one or more edges between nodes in the directed graph of a particular type of a relationship characteristic; and merging sets of the nodes between the identified one or more edges to generate an updated directed graph, wherein validating the SQL query is based on determining whether the nodes in the updated directed graph indicate the double counting.

In Example 18, the subject matter of Examples 14-17 includes, wherein generating the SQL query comprises generating a partial SQL query, wherein the validation of the SQL query is performed prior to the LLM completely generating the SQL query in response to the natural language query, the validation being performed on the partial SQL query, and the operations further comprising inputting feedback based on the validation into the LLM prior to the LLM completely generating the SQL query in order to cause generation of the updated SQL query prior to the LLM completely generating the SQL query.

In Example 19, the subject matter of Examples 14-18 includes, wherein the natural language query comprises a plurality of queries, wherein the semantic data is identified based on a latest query of the plurality of queries with the other queries providing context to the latest query.

Example 20 is computer-storage media comprising instructions that, when executed by one or more processors of a machine, configure the machine to perform operations comprising: receiving, at a cloud-based server, a natural language query from a user, the natural language query comprising a request associated with access of data in a database; identifying semantic data from the query; generating, by a large language model (LLM) based on the identified semantic data, a SQL query that comprises one or more join functions; parsing the generated SQL query to extract one or more operation types and data sources associated with the query; constructing an undirected graph from the parsed SQL query, the undirected graph comprised of nodes and edges, the nodes representing data sources, the edges representing operations linking the data sources comprising the one or more join functions; converting the undirected graph into a directed graph by adding relationship characteristics to the edges of the undirected graph; validating, based on the directed graph, the SQL query by determining whether the nodes in the directed graph indicate double counting based on the added relationship characteristics; and updating the generated SQL query based on the validation to remove the double counting.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 10:
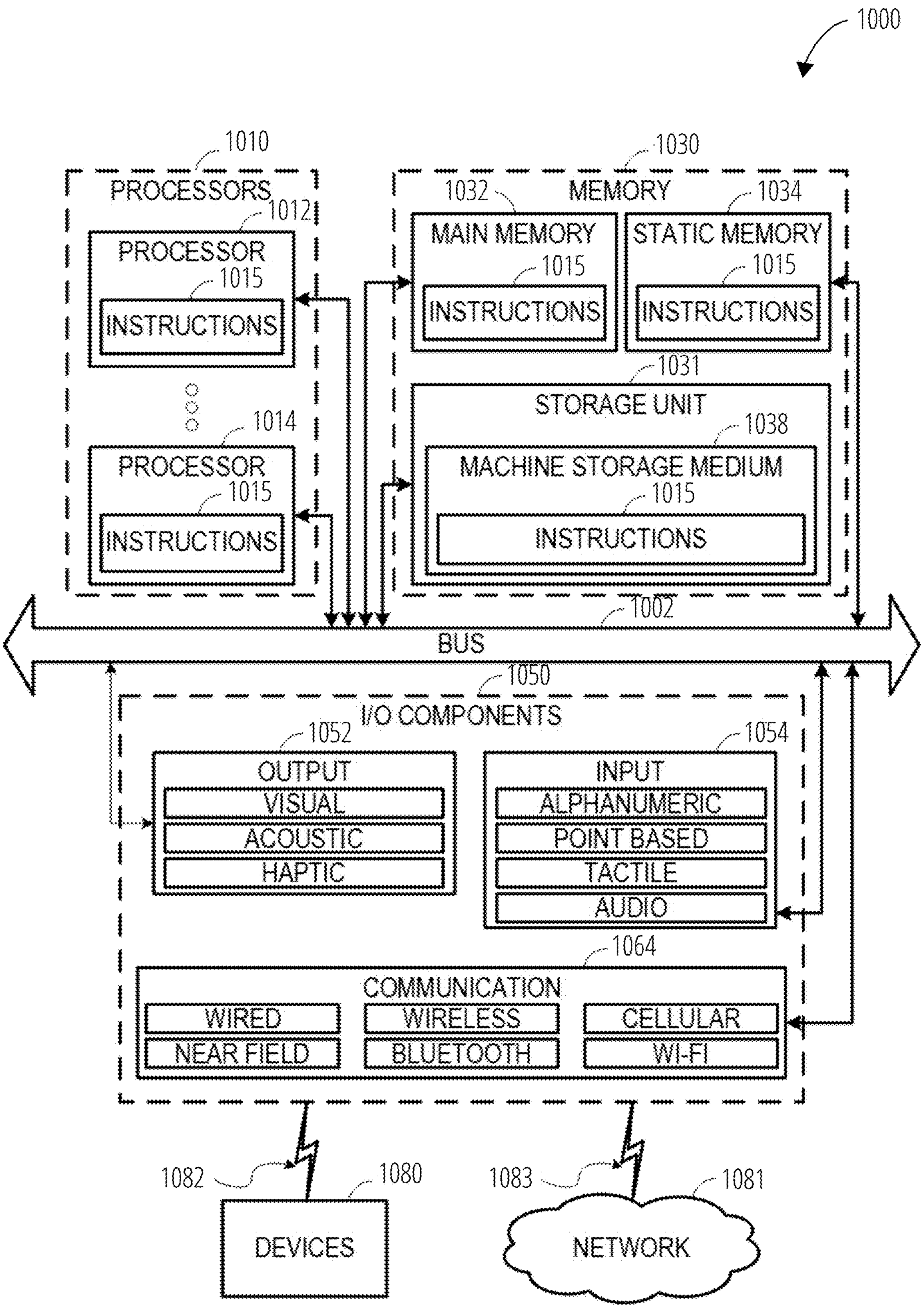
FIG. 10 illustrates a diagrammatic representation of a machine in the form of a computer system within which a set of instructions may be executed for causing the machine to perform any one or more of the methodologies discussed herein, in accordance with some examples of the present disclosure.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1015 (e.g., software, a program, an application, an applet, an app, or other executable code), for causing the machine 1000 to perform any one or more of the methodologies discussed herein, may be executed. For example, the instructions 1015 may cause the machine 1000 to implement portions of the data flows described herein (e.g., data flows described and depicted in FIG. 9). In this way, the instructions 1015 transform a general, non-programmed machine into a particular machine 1000 (e.g., the client device 112 of FIG. 1, the compute service manager 108 of FIG. 1, the execution platform 110 of FIG. 1) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1015, sequentially or otherwise, that specify actions to be taken by the machine 1000. Further, while only a single machine 1000 is illustrated, the term "machine" shall also be taken to include a collection of machines 1000 that individually or jointly execute the instructions 1015 to perform any one or more of the methodologies discussed herein.

The machine 1000 includes processors 1010 (such as processor 1012 and processor 1014), memory 1030, and input/output (I/O) I/O components 1050 (including output components 1052 and input components 1054) configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1015. The term "processor" is intended to include multi-core processors 1010 that may comprise two or more independent processors (sometimes referred to as "cores") that may execute instructions 1015 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1031, all accessible to the processors 1010 such as via the bus 1002. The main memory 1032, the static memory 1034, and the storage unit 1031 comprise a machine storage medium 1038 that may store the instructions 1015 embodying any one or more of the methodologies or functions described herein. The instructions 1015 may also reside, completely or partially, within the main memory 1032, within the static memory 1034, within the storage unit 1031, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines, such as mobile phones, will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1081 via a coupler 1083 or to devices 1080 via a coupling 1082. For example, the communication components 1064 may include a network interface component or another suitable device to interface with the network 1081. In further examples, the communication components 1064 may include wired communication components, wireless communication components, cellular communication components, and other communication components to provide communication via other modalities. The devices 1080 may be another machine or any of a wide variety of peripheral devices (e.g., a peripheral device coupled via a universal serial bus (USB)). For example, as noted above, the machine 1000 may correspond to any one of the client device 112, the compute service manager 108, and the execution platform 110, and may include any other of these systems and devices.

The various memories (e.g., 1030, 1032, 1034, and/or memory of the processor(s) 1010 and/or the storage unit 1031) may store one or more sets of instructions 1015 and data structures (e.g., software), embodying or utilized by any one or more of the methodologies or functions described herein. These instructions 1015, when executed by the processor(s) 1010, cause various operations to implement the disclosed embodiments.

Another general aspect is for a system that includes a memory comprising instructions and one or more computer processors or one or more hardware processors. The instructions, when executed by the one or more computer processors, cause the one or more computer processors to perform operations. In yet another general aspect, a tangible machine-readable storage medium (e.g., a non-transitory storage medium) includes instructions that, when executed by a machine, cause the machine to perform operations.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1081 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1081 or a portion of the network 1081 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1015 may be transmitted or received over the network 1081 using a transmission medium via a network interface device (e.g., a network interface component included in the communication components 1064) and utilizing any one of a number of well-known transfer protocols (e.g., hypertext transfer protocol (HTTP)). Similarly, the instructions 1015 may be transmitted or received using a transmission medium via the coupling 1082 (e.g., a peer-to-peer coupling) to the devices 1080. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1015 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/of" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and sub-combinations are intended to fall within the scope of this disclosure. In addition, certain method or process blocks may be omitted in some implementations.

What is claimed is:

1. A system comprising:

at least one hardware processor; and at least one memory storing instructions that cause the at least one hardware processor to perform operations comprising:

receiving, at a cloud-based server, a natural language query from a user, the natural language query comprising a request associated with access of data in a database; and in response to the receiving of the natural language query:

identifying, by a large language model (LLM) inputted feedback and executed on a computing system and based on a latest query of a plurality of queries with other queries providing context to the latest query, semantic data from the natural language query, wherein the semantic data comprises relationships between data tables requested in the natural language query;

generating, by the large language model (LLM) based on the identified semantic data, a Structured Query Language (SQL) query that comprises one or more join functions;

parsing the generated SQL query to extract one or more operation types and data sources associated with the generated SQL query;

constructing an undirected graph from the parsed SQL query, the undirected graph comprised of nodes and edges, the nodes representing data sources, the edges representing operations linking the data sources comprising the one or more join functions;

converting the undirected graph into a directed graph by adding relationship characteristics to the edges of the undirected graph;

validating, based on the directed graph, the generated SQL query by determining whether the nodes in the directed graph indicate double counting based on the added relationship characteristics; and automatically updating the generated SQL query based on the validation to remove the double counting, wherein the updating the SQL query comprises:

updating one or more keys of the one or more join functions;

sending an indication of the double counting to the LLM causing the LLM to generate the updated SQL query for performing aggregations on a table in the database stored in a storage device of the computing system.

2. The system of claim 1, wherein the semantic data comprises specific columns or attributes requested in the natural language query, and wherein the LLM generates the SQL query based on the specific columns or attributes requested in the natural language query.

3. The system of claim 1, wherein the LLM generates the SQL query based on the one or more relationships between the data tables requested in the natural language query.

4. The system of claim 1, wherein the semantic data comprises operations data to be applied to data requested in the natural language query, and wherein the LLM generates the SQL query based on the operations data.

5. The system of claim 1, wherein the parsing of the generated SQL query comprises generating tokens representing portions of the generated SQL query and generating a syntax tree comprised of the generated tokens reflecting the generated SQL query's logical flow, and wherein the undirected graph is constructed using the syntax tree.

6. The system of claim 1, wherein the undirected graph comprises edges between nodes without a directional flow.

7. The system of claim 1, wherein the converting of the undirected graph into the directed graph comprises adding at least one one-to-many relationship in between nodes.

8. The system of claim 1, wherein the converting of the undirected graph into the directed graph comprises identifying fact tables and dimension tables, and identifying a relationship such that a many side of a one-to-many relationship is assigned to a node associated with a fact table, and a many side of the one-to-many relationship is assigned to the node associated with the dimension table.

9. The system of claim 1, wherein the updating of the generated SQL query comprises modifying the one or more join functions within the SQL query.

10. The system of claim 9, wherein the one or more join functions comprise an inner join function, and wherein the updating of the generated SQL query comprises limiting data on a many side of a one-to-many relationship for the inner join function.

11. The system of claim 9, wherein the updating of the one or more keys of the one or more join functions comprises updating one or more primary or foreign keys of an inner join function of the one or more join functions.

12. The system of claim 1, wherein the updating of the generated SQL query comprises:

identifying a fact table side and a dimension side of the one or more join functions; and restricting the one or more join functions to perform aggregations only on the fact table side.

13. A method performed by at least one hardware processor, the method comprising:

receiving, at a cloud-based server, a natural language query from a user, the natural language query comprising a request associated with access of data in a database; and in response to the receiving of the natural language query:

identifying, by a large language model (LLM) inputted feedback and executed on a computing system and based on a latest query of a plurality of queries with other queries providing context to the latest query, semantic data from the natural language query, wherein the semantic data comprises relationships between data tables requested in the natural language query;

generating, by the large language model (LLM) based on the identified semantic data, a Structured Query Language (SQL) query that comprises one or more join functions;

parsing the generated SQL query to extract one or more operation types and data sources associated with the generated SQL query;

constructing an undirected graph from the parsed SQL query, the undirected graph comprised of nodes and edges, the nodes representing data sources, the edges representing operations linking the data sources comprising the one or more join functions;

converting the undirected graph into a directed graph by adding relationship characteristics to the edges of the undirected graph;

validating, based on the directed graph, the generated SQL query by determining whether the nodes in the directed graph indicate double counting based on the added relationship characteristics; and automatically updating the generated SQL query based on the validation to remove the double counting, wherein the updating the SQL query comprises:

updating one or more keys of the one or more join functions;

sending an indication of the double counting to the LLM causing the LLM to generate the updated SQL query for performing aggregations on a table in the database stored in a storage device of the computing system.

14. The method of claim 13, wherein the operations further comprise:

continuously:

updating the generated SQL query via the LLM; and validating the updated SQL query based on an updated directed graph; until determining that the nodes in the directed graph do not indicate double counting.

15. The method of claim 13, wherein the operations further comprise:

identifying one or more edges between nodes in the directed graph of a particular type of a relationship characteristic; and merging sets of the nodes between the identified one or more edges to generate an updated directed graph, wherein validating the SQL query is based on determining whether the nodes in the updated directed graph indicate the double counting.

16. The method of claim 13, wherein generating the SQL query comprises generating a partial SQL query, wherein the validation of the SQL query is performed prior to the LLM completely generating the SQL query in response to the natural language query, the validation being performed on the partial SQL query, and the operations further comprising inputting feedback based on the validation into the LLM prior to the LLM completely generating the SQL query in order to cause generation of the updated SQL query prior to the LLM completely generating the SQL query.

17. Computer-storage media comprising instructions that, when executed by one or more processors of a machine, configure the machine to perform operations comprising:

receiving, at a cloud-based server, a natural language query from a user, the natural language query comprising a request associated with access of data in a database; and in response to the receiving of the natural language query:

identifying, by a large language model (LLM) inputted feedback and executed on a computing system and based on a latest query of a plurality of queries with other queries providing context to the latest query, semantic data from the natural language query, wherein the semantic data comprises relationships between data tables requested in the natural language query;

generating, by the large language model (LLM) based on the identified semantic data, a Structured Query Language (SQL) query that comprises one or more join functions;

parsing the generated SQL query to extract one or more operation types and data sources associated with the generated SQL query;

constructing an undirected graph from the parsed SQL query, the undirected graph comprised of nodes and edges, the nodes representing data sources, the edges representing operations linking the data sources comprising the one or more join functions;

converting the undirected graph into a directed graph by adding relationship characteristics to the edges of the undirected graph;

validating, based on the directed graph, the generated SQL query by determining whether the nodes in the directed graph indicate double counting based on the added relationship characteristics; and automatically updating the generated SQL query based on the validation to remove the double counting, wherein the updating the SQL query comprises:

updating one or more keys of the one or more join functions;

sending an indication of the double counting to the LLM causing the LLM to generate the updated SQL query for performing aggregations on a table in the database stored in a storage device of the computing system.

* * * * *